United States Patent
Matsumura et al.

(10) Patent No.: US 10,869,221 B2
(45) Date of Patent: Dec. 15, 2020

(54) USER TERMINAL AND WIRELESS COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/341,218

(22) PCT Filed: Aug. 2, 2017

(86) PCT No.: PCT/JP2017/028125
§ 371 (c)(1),
(2) Date: Apr. 11, 2019

(87) PCT Pub. No.: WO2018/070095
PCT Pub. Date: Apr. 19, 2018

(65) Prior Publication Data
US 2019/0320344 A1 Oct. 17, 2019

(30) Foreign Application Priority Data
Oct. 13, 2016 (JP) .................................. 2016-201883

(51) Int. Cl.
| H04L 27/26 | (2006.01) |
| H04W 28/04 | (2009.01) |
| H04L 5/00 | (2006.01) |
| H04W 72/04 | (2009.01) |

(52) U.S. Cl.
CPC ............ *H04W 28/04* (2013.01); *H04L 5/0055* (2013.01); *H04L 5/0082* (2013.01); *H04W 72/0453* (2013.01)

(58) Field of Classification Search
None
See application file for complete search history.

(56) References Cited

U.S. PATENT DOCUMENTS

| 8,300,582 | B2 * | 10/2012 | Malladi | ................. | H04L 1/1671 |
| | | | | | 370/329 |
| 9,232,508 | B2 * | 1/2016 | Zhang | ............... | H04W 72/0413 |
| 9,326,154 | B2 * | 4/2016 | Abe | ....................... | H04L 5/0007 |
| 9,509,362 | B2 * | 11/2016 | Guzelgoz | ............ | H04L 27/3405 |

(Continued)

OTHER PUBLICATIONS

International Search Report issued in PCT/JP2017/028125 dated Oct. 24, 2017 (3 pages).

(Continued)

*Primary Examiner* — Sithu Ko
(74) *Attorney, Agent, or Firm* — Osha Bergman Watanabe & Burton LLP

(57) ABSTRACT

A user terminal (20) is provided with: an error detection unit (205) that detects the presence/absence of an error concerning a downlink data signal and generates ACK or NACK which are error detection results; and a mapping unit (207) that maps a transmission signal on a first frequency resource in one symbol and corresponding to ACK when the error detection result is ACK, and maps a transmission signal on a second frequency resource different from the first frequency resource in the same symbol corresponding to NACK when the error detection result is NACK.

4 Claims, 20 Drawing Sheets

(56) References Cited

U.S. PATENT DOCUMENTS

| | | | |
|---|---|---|---|
| 9,603,130 B2* | 3/2017 | Joung | H04L 1/203 |
| 9,722,753 B2* | 8/2017 | Lee | H04L 5/0055 |
| 10,736,130 B2* | 8/2020 | Han | H04W 72/1284 |
| 2012/0320805 A1* | 12/2012 | Yang | H04L 1/1861 |
| | | | 370/280 |
| 2017/0041103 A1* | 2/2017 | Maattanen | H04B 7/0626 |
| 2018/0316464 A1* | 11/2018 | Stern-Berkowitz | |
| | | | H04L 1/1657 |
| 2019/0013908 A1* | 1/2019 | Xiong | H04L 27/2627 |
| 2019/0098622 A1* | 3/2019 | Lee | H04W 72/0446 |
| 2020/0145147 A1* | 5/2020 | Kwak | H04W 72/0446 |

OTHER PUBLICATIONS

Written Opinion of the International Searching Authority issued in PCT/JP2017/028125 dated Oct. 24, 2017 (3 pages).

ZTE Corp, ZTE Microelectronics; "PUCCH to carry HARQ-ACK for sTTI"; 3GPP TSG RAN WG1 Meeting #86, R1-167868; Gothenburg, Sweden; Aug. 22-26, 2016 (6 pages).

LG Electronics; "sPUCCH for HARQ-ACK in shortened TTI"; 3GPP TSG RAN WG1 Meeting #86bis, R1-1609216; Lisbon, Portugal; Oct. 10-14, 2016 (7 pages).

* cited by examiner

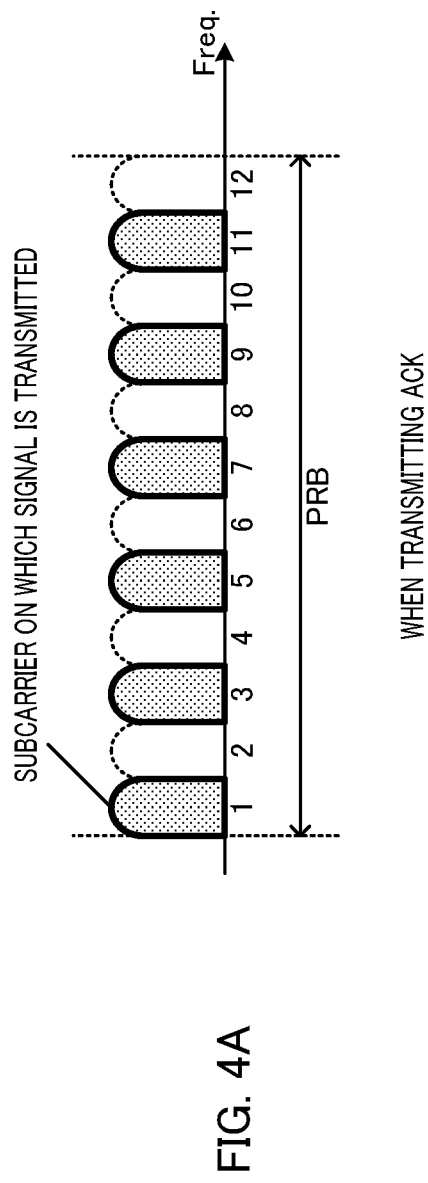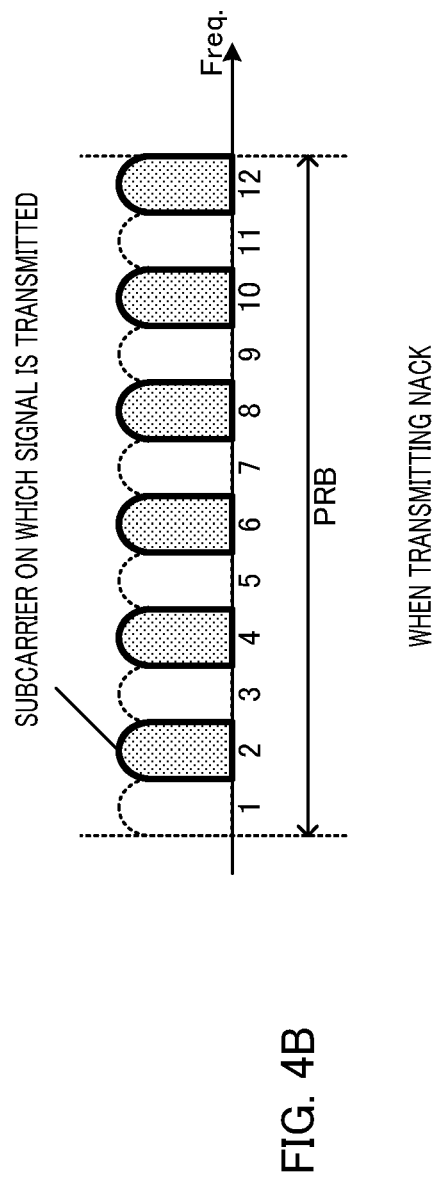
FIG. 4A
FIG. 4B

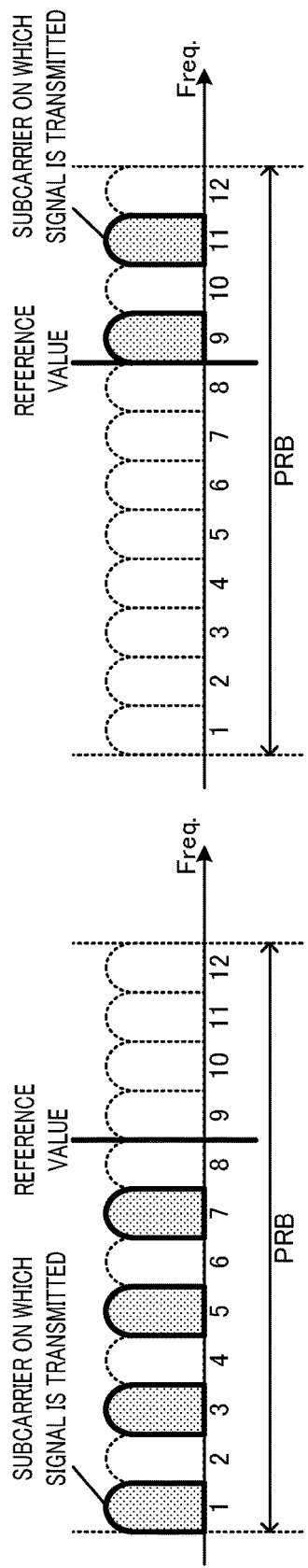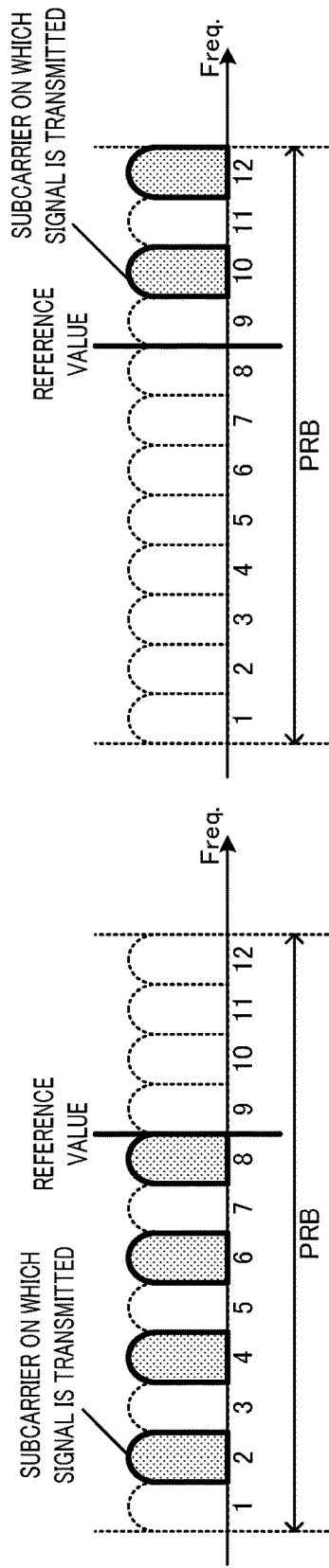
FIG. 11A  WHEN UE 1 TRANSMITS NACK
FIG. 11B  WHEN UE 1 TRANSMITS ACK
FIG. 11C  WHEN UE 2 TRANSMITS NACK
FIG. 11D  WHEN UE 2 TRANSMITS ACK

US 10,869,221 B2

USER TERMINAL AND WIRELESS COMMUNICATION METHOD

TECHNICAL FIELD

The present invention relates to a user terminal and a radio communication method in a next-generation mobile communication system.

BACKGROUND ART

In a UMTS (Universal Mobile Telecommunication System) network, Long Term Evolution (LTE) is specified for a higher data rate, lower latency, and/or the like. For a broader bandwidth and a higher speed based on LTE, future systems of LTE are also studied (for example, the systems are called LTE-A (LTE-Advanced), FRA (Future Radio Access), 5G (5th generation mobile communication system), 5G+(5G plus), and New-RAT (Radio Access Technology)).

In a future radio communication system (for example, 5G), in order to realize latency reduction, reduction of the length of a Transmission Time Interval (TTI) that is a minimum time unit of scheduling is considered. While the TTI length in the existing LTE system has 14 symbols, the length of a shortened TTI (hereinafter, it may also be referred to as "sTTI") has 7 symbols or shorter.

Moreover, in the future radio communication system, Hybrid Automatic Repeat Request (HARQ) is applied to downlink data. That is, a user terminal (user equipment: UE) notifies (gives feedback to) a radio base station (may also be called as eNB) of ACK (no error) or NACK (error) indicating an error detection result with respect to the downlink data.

As a conventional method for notifying ACK/NACK, a method of transmitting an uplink control channel including ACK/NACK (for example, Physical Uplink Control Channel (PUCCH), may also be called as sPUCCH), by using a sTTI configured of 2 symbols, has been proposed, for example (For example, refer to NPL 1).

CITATION LIST

Non-Patent Literature

NPL 1 R1-167868, ZTE Corp, ZTE Microelectronics, "PUCCH to carry HARQ-ACK for sTTI," August 2016

SUMMARY OF INVENTION

Technical Problem

In the future, it is conceivable to shorten the sTTI length to 1 symbol in order to realize further latency reduction. However, conventional art requires 2 symbols to feedback ACK/NACK, and no sufficient consideration has been made as to how to feedback ACK/NACK in the sTTI length of 1 symbol.

An aspect of the present invention is to provide a user terminal and a radio communication method capable of providing notification of ACK/NACK in 1 symbol in a future radio communication system.

Solution to Problem

A user terminal according to an aspect of the present invention includes: an error detector that detects presence or absence of an error with respect to a downlink data signal, and generates an ACK or NACK which is an error detection result; and a mapper that maps, when the error detection result is ACK, a transmission signal to a first frequency resource in one symbol associated with the ACK, and that maps, when the error detection result is NACK, the transmission signal to a second frequency resource which is different from the first frequency resource in a same symbol and which is associated with the NACK.

Advantageous Effects of Invention

According to the aspect of the present invention, it is possible to give notice of ACK/NACK in 1 symbol in a future radio communication system.

BRIEF DESCRIPTION OF DRAWINGS

FIG. 4A shows an example of mapping at the time of transmitting ACK according to Embodiment 1;

FIG. 4B shows an example of mapping at the time of transmitting NACK according to Embodiment 1;

FIG. 11A shows an example of mapping at the time of transmitting NACK by UE 1 according to Embodiment 3;

FIG. 11B shows an example of mapping at the time of transmitting ACK by UE 1 according to Embodiment 3;

FIG. 11C shows an example of mapping at the time of transmitting NACK by UE 2 according to Embodiment 3;

FIG. 11D shows an example of mapping at the time of transmitting ACK by UE 2 according to Embodiment 3;

DESCRIPTION OF EMBODIMENTS

Embodiments of the present invention will be described in detail below with reference to the accompanying drawings.

Embodiment 1

Figure 1:
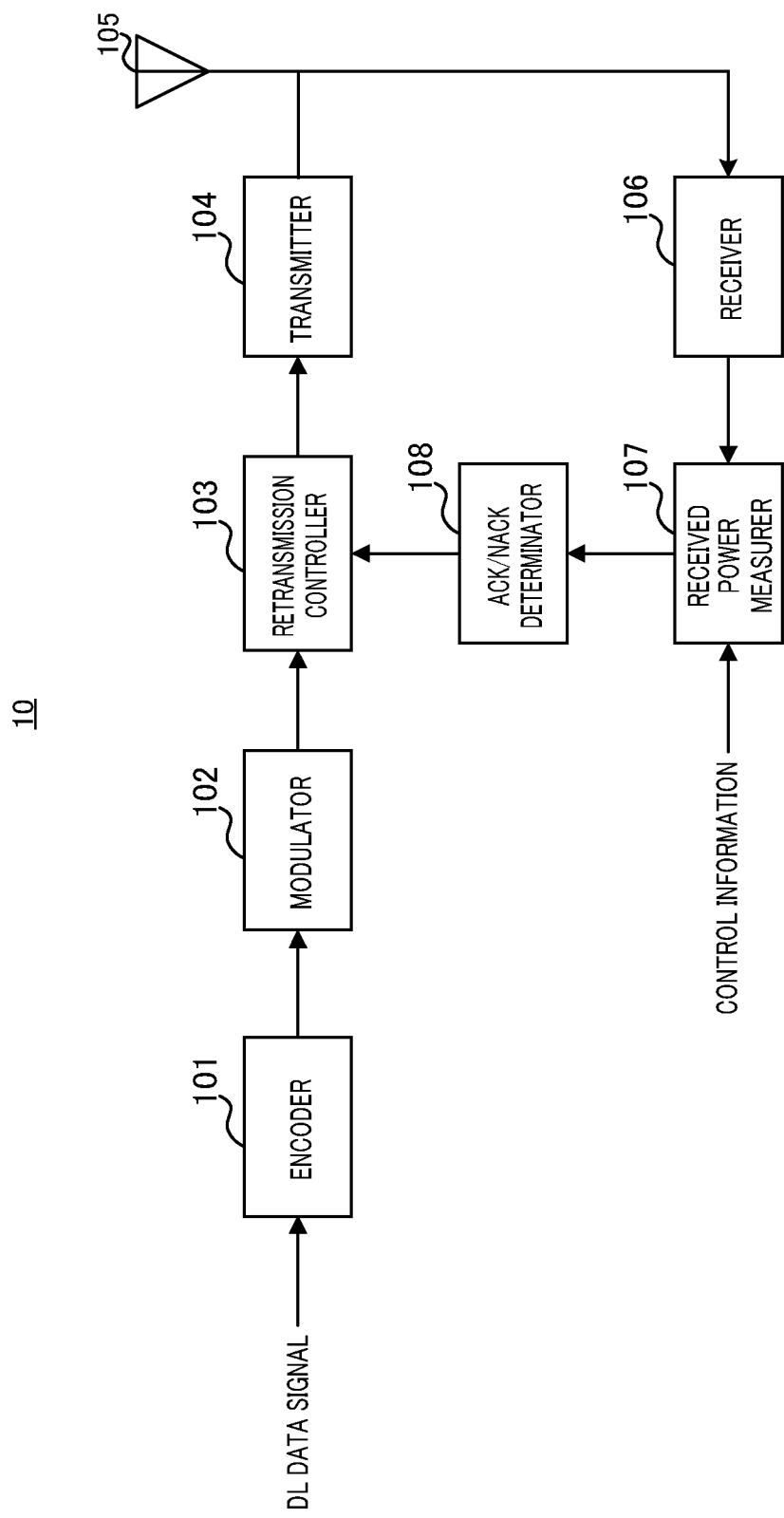
FIG. 1 is a block diagram showing an exemplary configuration of a radio base station according to Embodiment 1.
Figure 2:
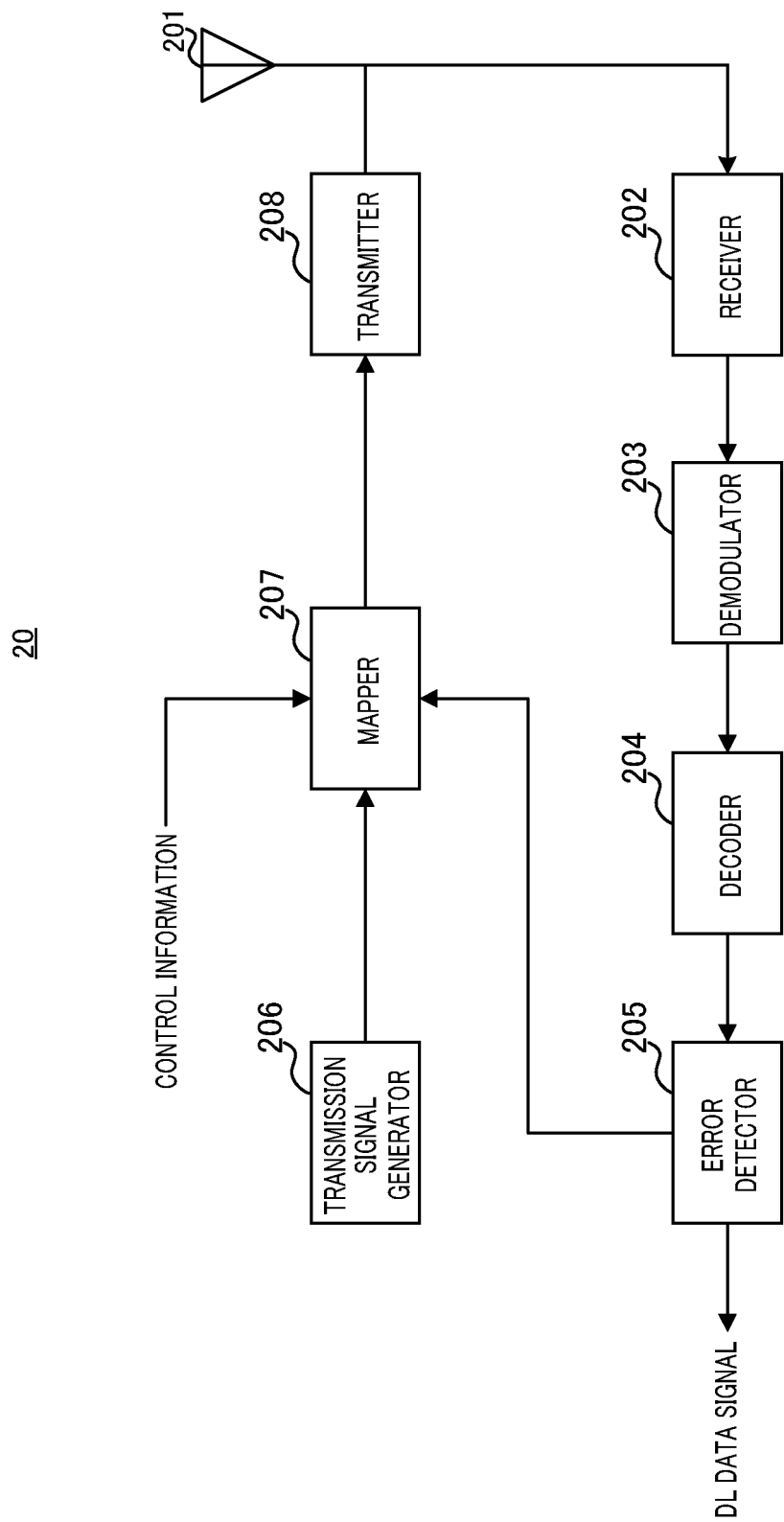
FIG. 2 is a block diagram showing an exemplary configuration of a user terminal according to Embodiment 1.

A radio communication system according to Embodiment 1 includes at least radio base station 10 shown in FIG. 1 and user terminal 20 shown in FIG. 2. User terminal 20 is connected to (accesses) radio base station 10. Radio base station 10 transmits, to user terminal 20, a DL data signal (for example, it may also be referred to as a Physical Downlink Shared Channel (PDSCH) or a downlink data channel). User terminal 20 notifies radio base station 10 of ACK/NACK with respect to a DL data signal.

Radio base station 10 and user terminal 20 use a sTTI configured of 1 symbol, for example. Note that the present invention is not limited to a radio communication system in which the sTTI (or TTI) length is 1 symbol. The present invention may be applied to a radio communication system in which user terminal 20 transmits a transmission signal by using 1 symbol.

In the present embodiment, ACK and NACK are associated with the position of a frequency resource (subcarrier) for ACK/NACK. In other words, ACK and NACK are associated with different frequency resources, respectively.

<Radio Base Station>

FIG. 1 shows an example of the overall configuration of a radio base station according to Embodiment 1. Radio base station 10 shown in FIG. 1 employs a configuration including encoder 101, modulator 102, retransmission controller 103, transmitter 104, antenna 105, receiver 106, received power measurer 107, and ACK/NACK determiner 108.

Encoder 101 encodes downlink data (DL data signal), and outputs an encoded DL data signal to modulator 102.

Modulator 102 modulates the DL data signal input from encoder 101, and outputs the modulated DL data signal to retransmission controller 103.

Retransmission controller 103 controls retransmission of the DL data signal, based on a determination result (ACK or NACK) input from ACK/NACK determiner 108. Specifically, at the time of initial transmission, retransmission controller 103 outputs DL data signal (new data) input from modulator 102 to transmitter 104, and also retains the DL data signal. In the case where the determination result is NACK, retransmission controller 103 outputs, to transmitter 104, retransmission data corresponding to the NACK, among the retained DL data signals (retransmission data). In the case where the determination result is ACK, retransmission controller 103 discards the retransmission data corresponding to the ACK.

Transmitter 104 performs transmission processing such as up-conversion and amplification on the DL data signal (baseband signal) input from retransmission controller 103, and transmits the DL data signal (radio frequency signal) after the transmission processing from antenna 105.

Receiver 106 performs reception processing such as amplification and down-conversion on the signal (radio frequency signal) received by antenna 105, and outputs the signal (baseband signal) after the reception processing to the received power measurer 107.

To received power measurer 107, control information is input. Control information includes resource assignment information indicating a resource for ACK/NACK (also referred to as Physical Resource Block (PRB), resource unit, resource block pair, and/or the like, for example) assigned to each user terminal 20, information related to association between a subcarrier in the PRB and the ACK/NACK, for example.

Received power measurer 107 measures received power of each subcarrier in the PRB to which ACK/NACK is assigned, and outputs information indicating the measured received power to ACK/NACK determiner 108.

ACK/NACK determiner 108 identifies a subcarrier in which a signal is observed (for example, a subcarrier in which received power is equal to or higher than a threshold) in the PRB, based on the received power of each subcarrier input from received power measurer 107. Then, ACK/NACK determiner 108 determines which of ACK or NACK is notified from user terminal 20, based on the position of the subcarrier (or subcarrier number) in which the signal is observed. ACK/NACK determiner 108 outputs the determination result (ACK or NACK) to retransmission controller 103. The details of the ACK/NACK determination processing by ACK/NACK determiner 108 will be described below.

<User Terminal>

FIG. 2 shows an example of the overall configuration of a user terminal according to Embodiment 1. User terminal 20 shown in FIG. 2 employs a configuration including antenna 201, receiver 202, demodulator 203, decoder 204, error detector 205, transmission signal generator 206, mapper 207, and transmitter 208.

Receiver 202 performs reception processing such as amplification and down-conversion on a DL data signal (radio frequency signal) received by antenna 201, and outputs the DL data signal (baseband signal) after the reception processing to demodulator 203.

Demodulator 203 demodulates the DL data signal input from receiver 202, and outputs the demodulated DL data signal to decoder 204.

Decoder 204 decodes the DL data signal input from demodulator 203, and outputs the decoded DL data signal to error detector 205.

Error detector 205 performs error detection processing using Cyclic Redundancy Check (CRC), for example, on the DL data signal input from decoder 204, to detect presence or absence of an error, and generates ACK (no error) or NACK (error) as an error detection result. Error detector 205 outputs the error detection result to mapper 207. When there is no error, error detector 205 outputs the DL data signal to an upper layer processor (not shown), for example.

Transmission signal generator 206 generates a transmission signal to be transmitted using a resource for ACK/NACK (PRB). The transmission signal may be a transmission signal sequence such as a Constant Amplitude Zero Auto Correlation (CAZAC) sequence, or may be uplink data (UL data signal), a control signal, or a Demodulation Reference Signal (DMRS), for example. Transmission signal generator 206 outputs the generated transmission signal to mapper 207.

To mapper 207, control information is input. The control information may be notified to user terminal 20 by using upper layer signaling, or a physical layer control channel (for example, may also be referred to as a Physical Downlink Control Channel (PDCCH) or a downlink control channel). Control information includes resource assignment information indicating a resource for ACK/NACK assigned to each user terminal 20 (for example, PRB), information related to association between a subcarrier in the PRB and ACK/NACK, and/or the like.

That is, mapper 207 identifies a subcarrier for mapping a transmission signal at the time of transmitting ACK, and a subcarrier for mapping a transmission signal at the time of transmitting NACK, based on the control information.

Then, when the error determination result input from error detector 205 is ACK, mapper 207 maps a transmission signal to the subcarrier associated with ACK, while when the error detection result is NACK, mapper 207 maps a transmission signal to the subcarrier associated with NACK. The details of mapping processing by mapper 207 will be described below.

Transmitter 208 performs transmission processing such as up-conversion and amplification on the transmission signal (baseband signal) input from mapper 207, and transmits the signal (radio frequency signal) after the transmission processing from antenna 201.

<Operation of Radio Base Station and User Terminal>

Next, ACK/NACK notification method in user terminal 20 and ACK/NACK determination method in radio base station 10 will be described in detail.

Figure 3D:
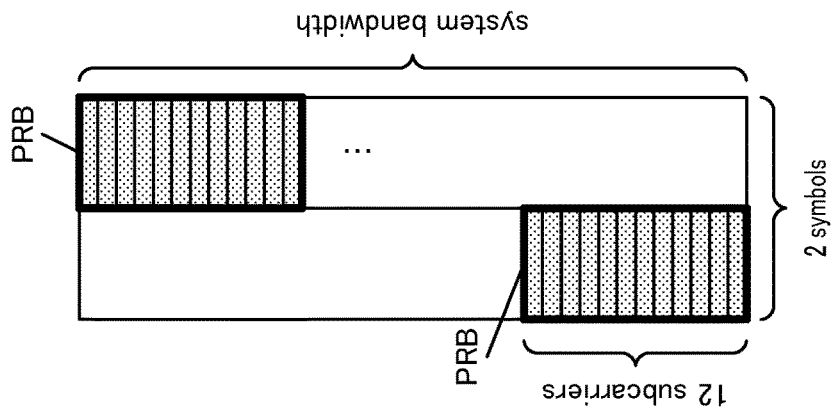
FIG. 3D shows an example of resource assignment to a user terminal (in the case of 2 PRBs) according to Embodiment 1.
Figure 3C:
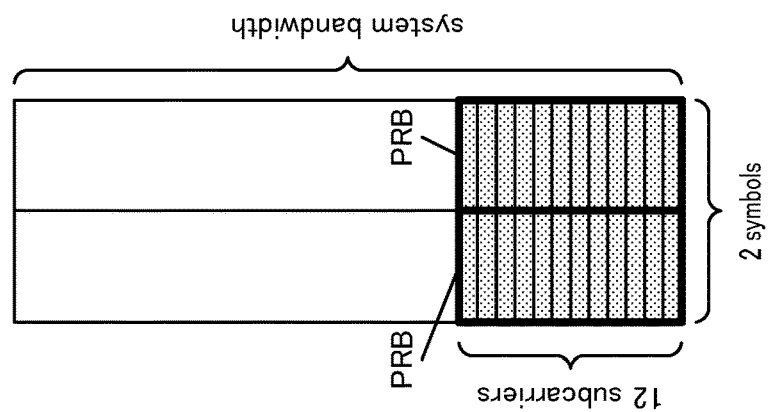
FIG. 3C shows an example of resource assignment to a user terminal (in the case of 2 PRBs) according to Embodiment 1.
Figure 3B:
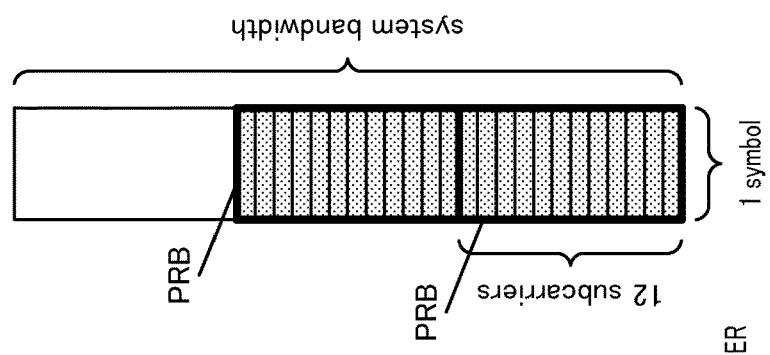
FIG. 3B shows an example of resource assignment to a user terminal (in the case of 2 PRBs) according to Embodiment 1.
Figure 3A:
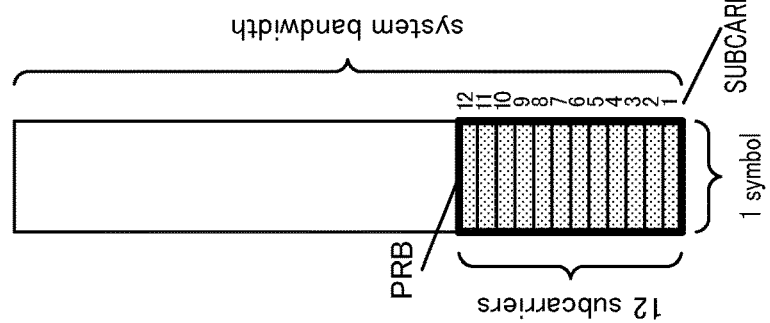
FIG. 3A shows an example of resource assignment to a user terminal (in the case of 1 PRB) according to Embodiment 1.

In the below description, a PRB serving as a resource assignment unit is defined by 1 symbol and twelve subcarriers (subcarrier numbers 1 to 12) as shown in FIG. 3A. The number of subcarriers and the subcarrier numbers constituting one PRB is not limited to the example shown in FIG. 3A (twelve subcarriers having subcarrier numbers 1 to 12).

From a network (for example, radio base station 10) to user terminal 20, resource assignment information indicating assignment of PRBs for ACK/NACK is notified using physical layer control information (for example, PDCCH). The network identifies the number of bits required by user terminal 20 for notification of ACK/NACK, based on information related to user terminal 20 such as the number of connected Component Carriers (CC), UE category, and the number of layers of Multiple Input Multiple Output (MIMO), and assigns the PRBs corresponding to the identified number of bits to user terminal 20. For example, the network may assign PRBs to user terminal 20 on an assumption that 1 bit of ACK/NACK (that is, ACK or NACK) is notified by using one PRB.

Note that user terminal 20 may calculate the number of bits required for notification of ACK/NACK and request the network for the number of PRBs corresponding to the number of bits required for notification of ACK/NACK. Alternatively, user terminal 20 may identify the PRB associated with the resource used for transmission of the physical layer control information (PDCCH) including the resource assignment information of the DL data signal, for example, as a resource for ACK/NACK with respect to the DL data signal.

Further, in the resource assignment for ACK/NACK, a plurality of PRBs may be instructed in a time direction or a frequency direction. FIG. 3A shows an example of assigning one PRB, and FIGS. 3B, 3C, and 3D show examples of assigning two PRBs. Specifically, in FIG. 3B, two PRBs are assigned consecutively in the frequency direction, in FIG. 3C, two PRBs are assigned consecutively in the time direction, and in FIG. 3D, two PRBs are assigned in a hopping manner in the time and frequency directions.

User terminal 20 notifies radio base station 10 of ACK/NACK by using the assigned PRB. For example, user terminal 20 notifies 1-bit ACK/NACK (that is, ACK or NACK) in each PRB shown in FIGS. 3A to 3D.

Next, a method of mapping a transmission signal in each PRB by user terminal 20 (mapper 207) for notification of ACK/NACK will be described. FIGS. 4A and 4B show examples of mapping according to Embodiment 1.

FIG. 4A shows mapping of signals at the time of transmitting ACK, and FIG. 4B shows mapping of signals at the time of transmitting NACK. Specifically, as shown in FIG. 4A, at the time of transmitting ACK, user terminal 20 maps transmission signals to odd-numbered subcarriers 1, 3, 5, 7, 9, and 11. Further, as shown in FIG. 4B, at the time of transmitting NACK, user terminal 20 maps transmission signals to even-numbered subcarriers 2, 4, 6, 8, 10, and 12.

That is, as shown in FIGS. 4A and 4B, ACK is associated with six odd-numbered subcarriers 1, 3, 5, 7, 9, and 11, and NACK is associated with six even-numbered subcarriers 2, 4, 6, 8, 10, and 12.

Here, the subcarriers associated with ACK and the subcarriers associated with NACK differ from each other. That is, user terminal 20 associates different subcarrier positions (subcarrier numbers) with ACK/NACK to thereby provide notification of ACK/NACK according to the subcarrier positions to which transmission signals are mapped.

Thus, user terminal 20 is able to notify ACK/NACK in 1 symbol by using the position of the subcarrier in each PRB.

On the other hand, radio base station 10 (received power measurer 107) measures received power of each subcarrier with respect to the received signal. Radio base station 10 (ACK/NACK determiner 108) also identifies a subcarrier in which a signal is observed, based on the received power. Then, radio base station 10 (ACK/NACK determiner 108) determines ACK/NACK notified from user terminal 20, based on the position of the subcarrier in which a signal is observed. Specifically, when a signal is observed in an odd-numbered subcarrier as shown in FIG. 4A, radio base station 10 determines that ACK is notified, while when a signal is observed in an even-numbered subcarrier, radio base station 10 determines that NACK is notified.

In FIGS. 4A and 4B, description has been given on the case where ACK and an odd-numbered subcarrier are associated with each other and NACK and an even-numbered subcarrier are associated with each other. However, frequency resources (subcarriers) associated with ACK may be either odd-numbered or even-numbered subcarriers among a plurality of subcarriers constituting a PRB, and frequency resources (subcarriers) associated with NACK may be the other odd-numbered or even-numbered subcarriers among the subcarriers constituting the PRB.

Figure 5:
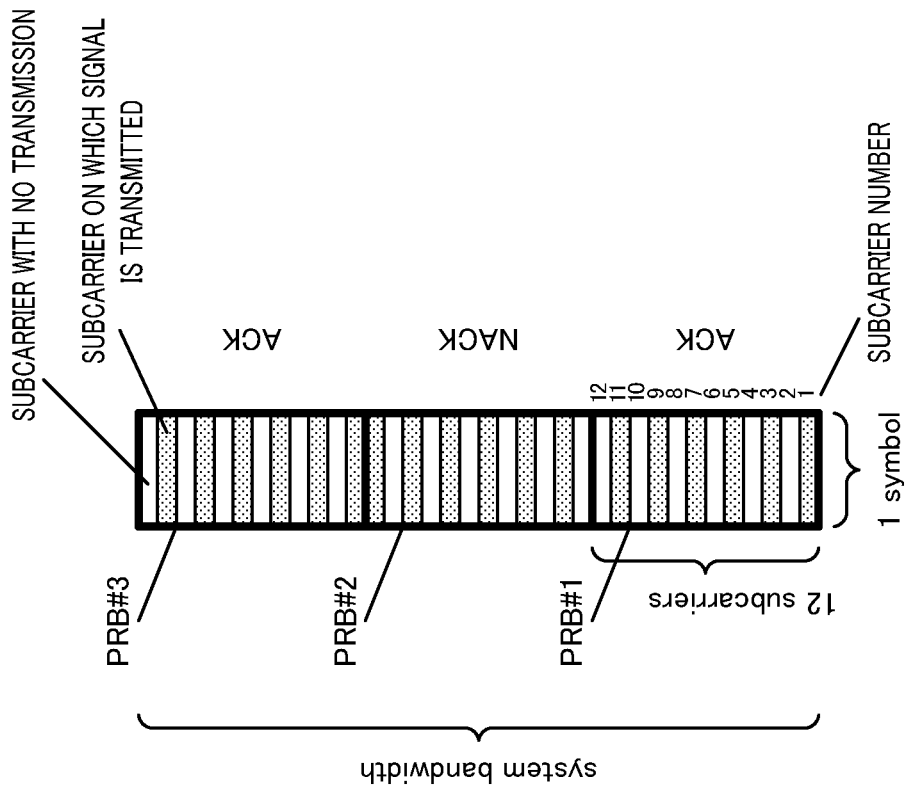
FIG. 5 shows an example of ACK/NACK notification according to Embodiment 1.

FIG. 5 shows an example of notification of ACK/NACK.

In FIG. 5, three PRBs are assigned in the frequency direction for ACK/NACK to user terminal 20. User terminal 20 is also notified of information about association between ACK/NACK and subcarriers in each PRB shown in FIGS. 4A and 4B. User terminal 20 also generates 3-bit ACK/NACK including ACK, NACK, and ACK, as an error detection result for a DL data signal.

When a plurality of PRBs are assigned, user terminal 20 assigns 3-bit ACK/NACK to each of the PRBs in a predetermined order. For example, the predetermined order may be an ascending order or a descending order of indexes (for example, PRB numbers) in the frequency direction or the time direction.

In the example shown in FIG. 5, user terminal 20 gives notification of ACK, NACK, and ACK in the ascending order of the PRB numbers, that is, in the order of PRB #1, PRB #2, and PRB #3, respectively. Specifically, in PRB #1, user terminal 20 maps transmission signals to the odd-numbered subcarriers 1, 3, 5, 7, 9, and 11 associated with ACK, in PRB #2, user terminal 20 maps transmission signals to the even-numbered subcarriers 2, 4, 6, 8, 10, and 12 associated with NACK, and in PRB #3, user terminal 20 maps transmission signals to the odd-numbered subcarriers 1, 3, 5, 7, 9, and 11 associated with ACK.

In FIG. 5, as signals are observed in the odd-numbered subcarriers in PRBs #1 and #3, radio base station 10 determines that ACK is notified, while as signals are observed in the even-numbered subcarriers in PRB #2, radio base station 10 determines that NACK is notified.

As described above, user terminal 20 maps the transmission signals to the frequency resources, according to the association between ACK/NACK and the positions of the frequency resources (subcarriers) on which transmission signals are transmitted. Specifically, since user terminal 20 maps transmission signals to different frequency resources (subcarriers) for ACK and NACK, radio base station 10 is able to determine which of ACK or NACK is notified depending on the position of the subcarrier in which the signal is observed. In other words, user terminal 20 uses the position of the subcarrier to implicitly notify ACK/NACK.

Here, notification of ACK/NACK by user terminal 20 requires only 1 symbol. That is, according to the present embodiment, it is possible to realize notification of ACK/NACK using 1 symbol, and to realize further latency reduction.

Moreover, according to the present embodiment, each of ACK and NACK is evenly associated alternately throughout subcarriers in one PRB. That is, transmission signals used for notification of ACK/NACK are distributively mapped in the frequency direction. Accordingly, it is possible to achieve a frequency diversity effect.

Embodiment 2

Due to doppler effect caused by movement of a user terminal, phase noise caused in an oscillator provided to a user terminal, and/or the like, in the receiving side (radio base station), there is a case where a signal is observed at a position deviated from the original subcarrier position where the user terminal mapped the signal (may be referred to as frequency offset or frequency shift).

In the present embodiment, description will be given on a method of correctly determining ACK/NACK on the receiving side even if a frequency offset occurs.

Regarding a radio base station and a user terminal according to Embodiment 2, the basic configurations thereof are common to those of radio base station 10 and user terminal 20 of Embodiment 1. Accordingly, description will be given with use of FIGS. 1 and 2.

A method of notifying ACK/NACK according to Embodiment 2 will be described below in detail.

Figure 6A:
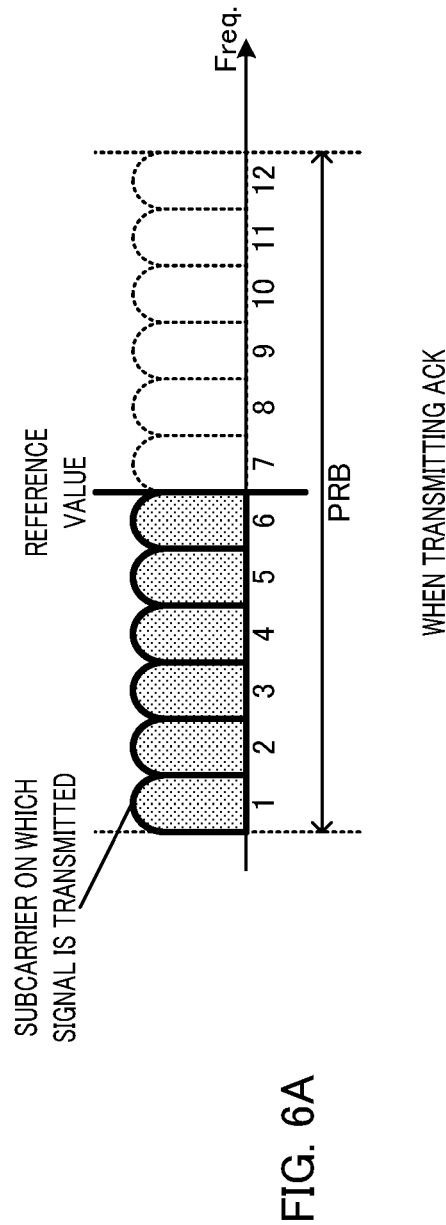
FIG. 6A shows an example of mapping at the time of transmitting ACK according to Embodiment 2.
Figure 6B:
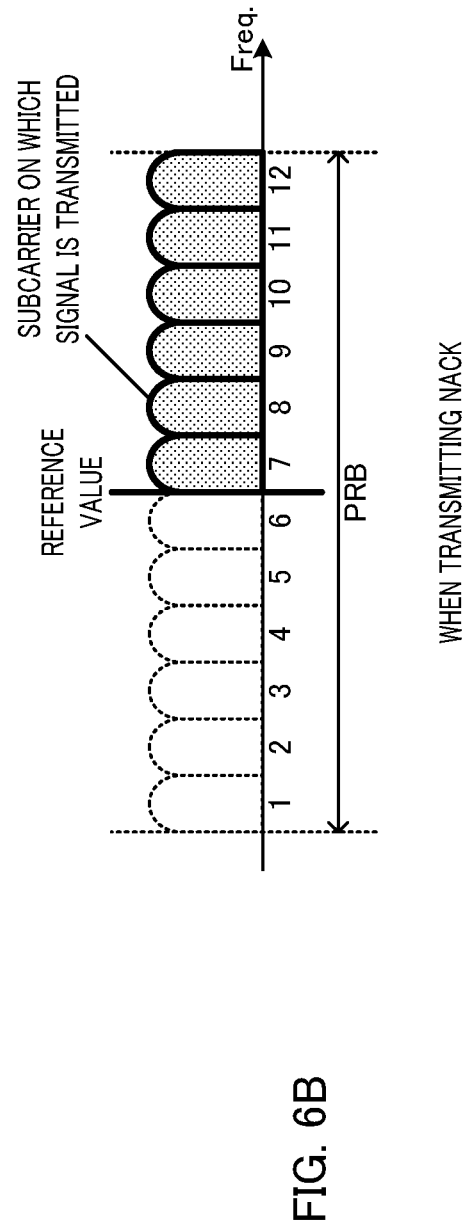
FIG. 6B shows an example of mapping at the time of transmitting NACK according to Embodiment 2.

FIGS. 6A and 6B show examples of mapping according to Embodiment 2.

FIG. 6A shows mapping of signals at the time of transmitting ACK, and FIG. 6B shows mapping of signals at the time of transmitting NACK.

Specifically, as a reference value for subcarriers serving as a reference value for determining ACK/NACK, a median of subcarriers (or center subcarrier) in one PRB is set. In FIGS. 6A and 6B, the boundary between subcarrier numbers 6 and 7 serves as a reference value. The reference value may be 6 that is the largest subcarrier number of the subcarriers associated with ACK shown in FIGS. 6A and 6B, or may be 7 that is the smallest subcarrier number of the subcarriers associated with NACK, for example. In the below description, subcarrier number 6 is used as a reference value.

The reference value of the subcarrier number is notified from a network (for example, radio base station 10) to user terminal 20 in advance. For example, the reference value may be notified with use of upper layer signaling or a physical layer control channel (for example, PDCCH), or may be notified as broadcast information such as cell information. The reference value of the subcarrier number may be given in a single integer value.

As shown in FIG. 6A, subcarriers associated with ACK are subcarriers having the subcarrier numbers 1 to 6 that are equal to or smaller than the reference value, among the subcarriers constituting the PRB. This means that at the time of transmitting ACK, user terminal 20 maps a transmission signal to subcarriers having the subcarrier numbers 1 to 6. Meanwhile, as shown in FIG. 6B, subcarriers associated with NACK are subcarriers having the subcarrier numbers 7 to 12 that are larger than the reference value, among the subcarriers constituting the PRB. This means that at the time of transmitting NACK, user terminal 20 maps transmission signals to subcarriers having the subcarrier numbers 7 to 12.

Here, the subcarriers associated with ACK and the subcarriers associated with NACK differ from each other. That is, user terminal 20 associates different subcarrier positions (subcarrier numbers) with ACK/NACK to thereby provide notification of ACK/NACK according to the subcarrier position to which the transmission signal is mapped.

Thus, user terminal 20 is able to provide notification of ACK/NACK in 1 symbol by using the position of the subcarrier in each PRB, similar to Embodiment 1.

On the other hand, radio base station 10 measures received power of each subcarrier with respect to the received signal. For example, in FIGS. 6A and 6B, radio base station 10 measures the received power of the subcarriers having the subcarrier numbers 1 to 6 that are equal to or smaller than the reference value and associated with ACK (hereinafter referred to as "ACK determination region"), and the received power of the subcarriers having the subcarrier numbers 7 to 12 that are larger than the reference value and associated with NACK (hereinafter, referred to as "NACK determination region"). Then, radio base station 10 compares the received power of the ACK determination region with the received power of the NACK determination region, and determines that ACK or NACK corresponding to a determination region having larger received power is notified from user terminal 20.

Figure 7:
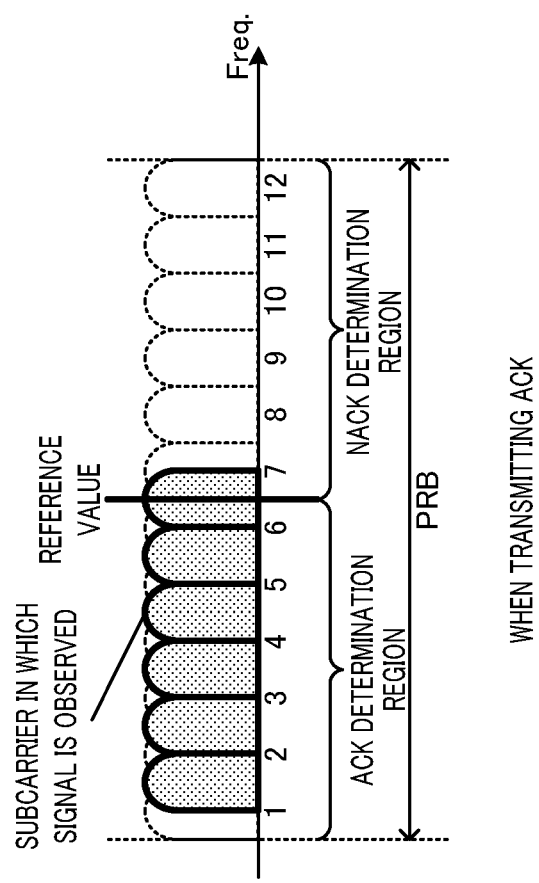
FIG. 7 shows an example of ACK/NACK determination according to Embodiment 2.

Through this processing, radio base station 10 can correctly determine ACK or NACK even if a frequency offset occurs. FIG. 7 shows a received signal in the case where a frequency offset occurs when user terminal 20 gives notification of ACK. As shown in FIG. 7, although transmission signals are transmitted in subcarriers having the subcarrier numbers 1 to 6 that are equal to or smaller than the reference value in user terminal 20, in radio base station 10, the signal is observed at a position (position indicated by a solid line) shifted from the original subcarrier position (position indicated by a dotted line).

In that case, as shown in FIG. 7, in radio base station 10, while the signal is observed in some subcarriers larger than the reference value (for example, a subcarrier having the subcarrier number 7), the received power in the ACK determination region (subcarrier numbers 1 to 6) is larger than the received power in the NACK determination region (subcarrier numbers 7 to 12). In other words, the number of subcarriers in which the signals are observed in the ACK determination region is larger than the number of subcarriers in which the signals are observed in the NACK determination region. Therefore, radio base station 10 is able to correctly determine that ACK is notified from user terminal 20 even if a frequency offset occurs as shown in FIG. 7.

As described above, in the present embodiment, the frequency resources constituting a PRB are divided into those associated with ACK and those associated with NACK, with use of the reference value as the boundary. Through this processing, even if the subcarrier position is shifted by a frequency offset, radio base station 10 is able to correctly determine ACK or NACK by absorbing the impact of the frequency shift, unless subcarrier positions corresponding to a half or more of the subcarriers in the ACK determination region or the NACK determination region are shifted.

Through this processing, according to the present embodiment, it is possible to prevent an increase in the bit error rate even in the case where a frequency offset becomes large in an environment where user terminal 20 moves at a high speed or an environment where high frequency is used.

In FIGS. 6A and 6B, description has been given on the case where ACK and the subcarriers of the subcarrier numbers equal to or smaller than the reference value (that is, low frequency side including the subcarrier serving as the reference) are associated with each other and NACK and the subcarriers having the subcarrier numbers larger than the reference value (that is, high frequency side from the subcarrier serving as the reference) are associated with each other. However, it is only necessary that frequency resources (subcarriers) associated with ACK may be subcarriers on either the high frequency side or the low frequency side including the subcarrier serving as the reference, among the subcarriers constituting a PRB, and frequency resources (subcarriers) associated with NACK may be the subcarriers other than those associated with ACK, among the subcarriers constituting the PRB.

Modification 1 of Embodiment 2

FIGS. 6A and 6B show the case of setting the median of the subcarriers in one PRB as a reference value. In other words, in FIGS. 6A and 6B, the number of subcarriers associated with each of ACK and NACK is the same. However, the number of subcarriers associated with each of ACK and NACK is not limited to the same number. The number of subcarriers associated with each of the ACK and NACK may be different.

Figure 8A:
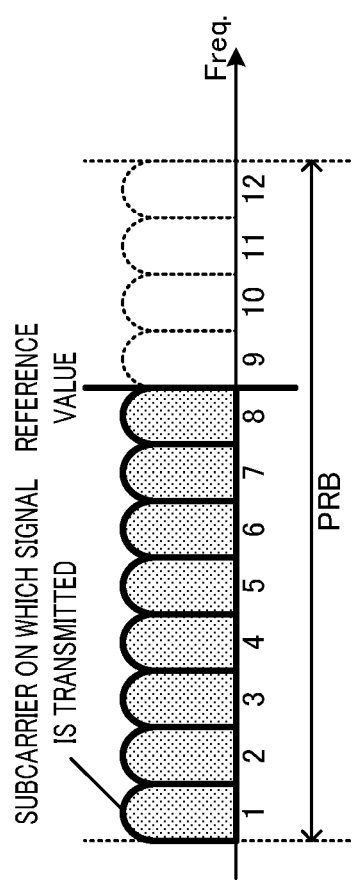
FIG. 8A shows an example of mapping at the time of transmitting NACK according Modification 1 of Embodiment 2.
Figure 8B:
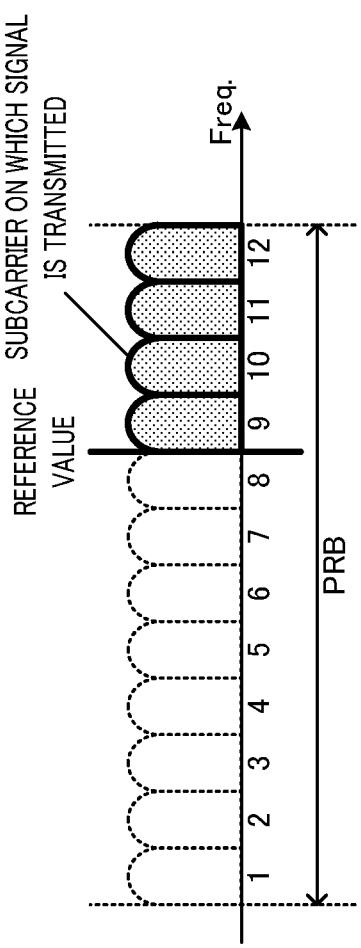
FIG. 8B shows an example of mapping at the time of transmitting ACK according Modification 1 of Embodiment 2.

FIGS. 8A and 8B show examples of mapping according to Modification 1 of Embodiment 2.

FIG. 8A shows mapping of transmission signals at the time of transmitting NACK, and FIG. 8B shows mapping of transmission signals at the time of transmitting ACK. Specifically, user terminal 20 sets the boundary between the subcarrier numbers 8 and 9 as a reference value. In FIGS. 8A and 8B, 8 that is the largest subcarrier number of the subcarriers associated with NACK is used as a reference value.

As shown in FIGS. 8A and 8B, NACK is associated with eight subcarriers having the subcarrier numbers 1 to 8 that are equal to or smaller than the reference value, and ACK is associated with four subcarriers having the subcarrier numbers 9 to 12 that are larger than the reference value. This means that the number of subcarriers (four) associated with ACK is smaller than the number of subcarriers (eight) associated with NACK.

In that case, as shown in FIG. 8A, at the time of transmitting NACK, user terminal 20 maps the transmission signals to subcarriers having the subcarrier numbers 1 to 8 that are equal to or smaller than the reference value and associated with NACK. On the other hand, as shown in FIG. 6B, at the time of transmitting ACK, user terminal 20 maps the transmission signals to the subcarriers having the subcarrier numbers 9 to 12 that are larger than the reference value and associated with ACK.

On the other hand, radio base station 10 measures the received power of each subcarrier with respect to the received signal, and compares the received power of the subcarriers having the subcarrier numbers 1 to 8 that are equal to or smaller than the reference value and associated with NACK (NACK determination region), with the received power of the subcarriers having the subcarrier numbers 9 to 12 that are larger than the reference value and associated with ACK (ACK determination region). Then, radio base station 10 determines that ACK or NACK corresponding to the determination region having larger received power is notified from user terminal 20.

Figure 9:
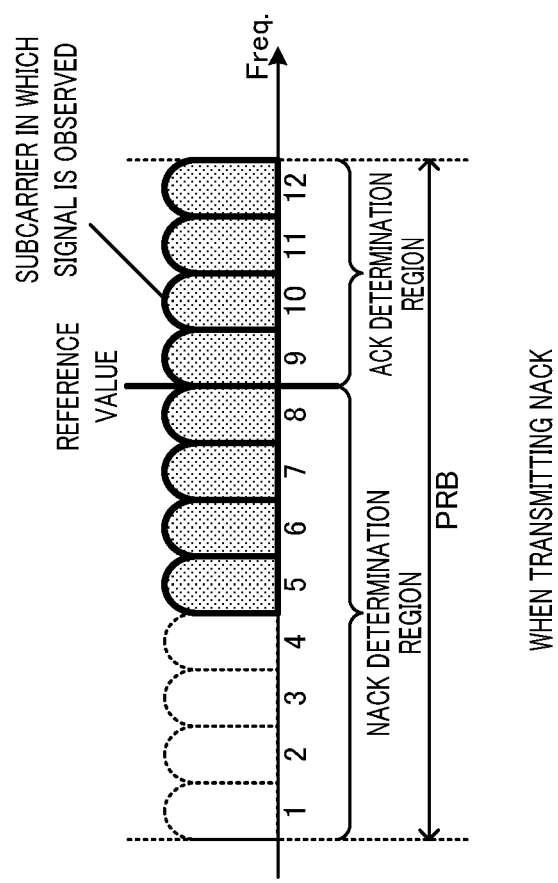
FIG. 9 shows an example of ACK/NACK determination according to Modification 1 of Embodiment 2.

Here, as shown in FIG. 9, when user terminal 20 gives notification of NACK (see FIG. 8A), there is a case where the frequency offset becomes larger and the signal is observed while being shifted by four subcarriers in radio base station 10. In that case, radio base station 10 is unable to determine which of ACK or NACK is notified even comparing the received power of the respective subcarriers corresponding to the ACK determination region and the NACK determination region as described above.

In that case, radio base station 10 determines which of ACK or NACK is notified based on the number of subcarriers in which the signals are observed in the entire PRB (twelve subcarriers). Specifically, in FIG. 9, radio base station 10 is able to determine that NACK is notified from user terminal 20, because the number of subcarriers in which the signals are observed in the entire PRB is eight, which is the same as the number of subcarriers associated with the NACK.

Note that in Modification 1 of Embodiment 2, description has been given on the case where a reference value is set such that the number of subcarriers associated with each of the ACK and NACK is different. However, radio base station 10 and user terminal 20 may give notification of ACK/NACK by associating ACK/NACK and the number of subcarriers with each other, regardless of the position of the subcarrier.

Modification 2 of Embodiment 2

In Modification 2 of Embodiment 2, description will be given on another ACK/NACK determination method in radio base station 10 in the case where the number of subcarriers associated with ACK and that associated with NACK are different.

As a method of mapping transmission signals for notification of ACK/NACK by user terminal 20 is similar to Modification 1 of Embodiment 2 (FIGS. 8A and 8B), the description thereof is omitted.

Specifically, radio base station 10 determines that ACK or NACK corresponding to a determination region in which the signal is observed in a larger number of subcarriers, of the ACK determination region and the NACK determination region, is notified from user terminal 20.

Figure 10:
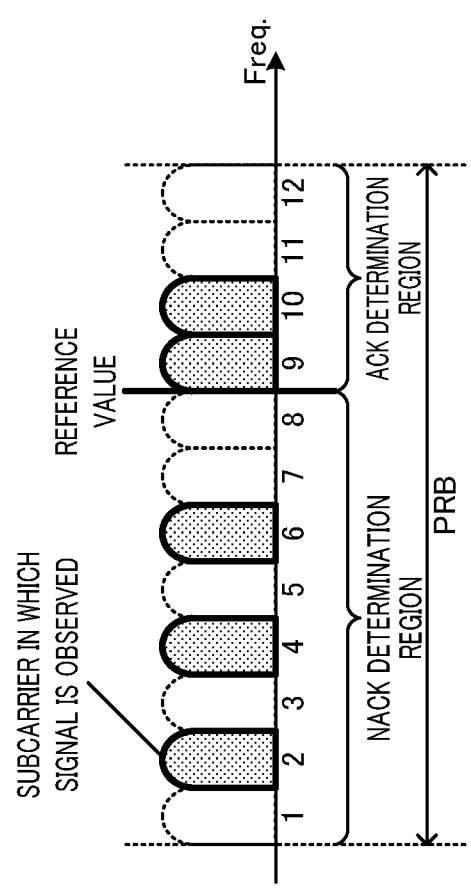
FIG. 10 shows an example of ACK/NACK determination according to Modification 2 of Embodiment 2.

FIG. 10 shows the case where, when user terminal 20 transmits NACK (see FIG. 8A), a random frequency offset is added, and signals are observed in both subcarriers corresponding to NACK and ACK in radio base station 10.

In FIG. 10, radio base station 10 observes the signals in five subcarriers of the subcarrier numbers 2, 4, 6, 9, and 10. In other words, the number of subcarriers in which the signals are observed in the NACK determination region is three, and the number of subcarriers in which the signals are observed in the ACK determination region is two. Accordingly, as the number of subcarriers in which the signals are observed is larger in the NACK determination region compared with that in the ACK determination region, radio base station 10 determines that NACK is notified from user terminal 20.

Modifications 1 and 2 of Embodiment 2 have been described.

As described above, according to Modifications 1 and 2 of Embodiment 2, when the number of subcarriers associated with ACK and that associated with NACK are different, the number of subcarriers in which the signals are observed differs for ACK and NACK in radio base station 10. With this configuration, even if the subcarrier positions where the signals are observed are shifted, radio base station 10 is able to determine ACK or NACK in accordance with the number of subcarriers in which the signals are observed.

Here, when radio base station 10 erroneously determines ARK as NACK (hereinafter referred to as "ACK to NACK error"), retransmission data corresponding to the NACK is transmitted by retransmission control by HARQ. On the other hand, when radio base station 10 erroneously determines NACK as ACK (hereinafter, referred to as "NACK to ACK error"), in radio base station 10, no retransmission data is transmitted and wrong data signal is given to an upper layer.

That is, in the ACK to NACK error, error correction can be made although the number of times of retransmission is increased by the retransmission control by HARQ. On the other hand, in the NACK to ACK error, retransmission control by HARQ (error correction) is not performed and retransmission processing is not performed until it is determined that retransmission is necessary in the upper layer. Therefore, transmission latency increases.

Therefore, it is preferable to avoid NACK to ACK error rather than ACK to NACK error.

Accordingly, in Modifications 1 and 2, the number of subcarriers associated with ACK may be set to be smaller than the number of subcarriers associated with NACK, as shown in FIGS. 8A and 8B. With this setting, even in the case where the communication environment is poor and some signals transmitted in the subcarrier associated with the NACK in user terminal 20 are observed while being shifted to the ACK determination region in radio base station 10, most of the rest of the signals can easily be observed in the NACK determination region. Therefore, the possibility that radio base station 10 determines user terminal 20 as NACK increases even if a frequency offset occurs. Through this processing, it is possible to reduce the NACK to ACK error rate, and to prevent transmission latency from being increased.

Moreover, in the present embodiment, the reference value of the subcarrier number may be a fixed value or a value changeable depending on the communication environment between radio base station 10 and user terminal 20 (for example, moving speed of user terminal 20, frequency to be used). For example, when the reference value of the subcarrier number is changed according to the communication environment, the difference between the number of subcarriers associated with ACK and that associated with NACK is adjusted according to the magnitude of a frequency offset that may occur. For example, the reference value may be set such that as the frequency offset is larger, the difference between the number of subcarriers associated with ACK and that associated with NACK is larger. With such setting, in radio base station 10, it is possible to accurately determine ACK/NACK even if a frequency offset occurs.

Embodiment 3

In this embodiment, description will be given on the case where transmission signals for ACK/NACK notification from a plurality of user terminals are multiplexed.

Regarding a radio base station and a user terminal according to Embodiment 3, the basic configurations thereof are common to radio base station 10 and user terminal 20 according to Embodiment 1. Accordingly, description will be given with use of FIGS. 1 and 2.

A method of notifying ACK/NACK according to Embodiment 3 will be described below in detail.

FIGS. 11A to 11D show examples of mapping according to Embodiment 3.

In FIGS. 11A to 11D, description will be given on the case where transmission signals of two user terminals 20 (UE 1 and UE 2) are multiplexed, as an example. However, the number of user terminals 20 in which transmission signals for notifying ACK/NACK are multiplexed may be three or more.

Further, in FIGS. 11A to 11D, description is given on the case where the number of subcarriers associated with ACK and that associated with NACK differ from each other, similar to Modification 1 or 2 of Embodiment 2. However, Embodiment 3 may be applicable to the case where the number of subcarriers associated with ACK and that associated with NACK are the same, as in Embodiment 1 (for example, see FIGS. 4A and 4B) or Embodiment 2 (for example, see FIGS. 6A and 6B).

Further, in the below description, "8", that is the largest subcarrier number of the subcarriers associated with NACK, is used as a reference value, in FIGS. 11A to 11B.

FIG. 11A shows mapping of signals at the time of transmitting NACK in UE 1, and FIG. 11B shows mapping of signals at the time of transmitting ACK in UE 1. Further, FIG. 11C shows mapping of signals at the time of transmitting NACK in UE 2, and FIG. 11D shows mapping of signals at the time of transmitting ACK in UE 2.

That is, at the time of transmitting NACK, UE 1 maps transmission signals to subcarriers associated with NACK and having odd numbers 1, 3, 5, and 7 equal to or smaller than the reference value, and at the time of transmitting ACK, UE 1 maps transmission signals to subcarriers associated with ACK and having odd numbers 9 and 11 larger than the reference value. Meanwhile, at the time of transmitting NACK, UE 2 maps transmission signals to subcarriers associated with NACK and having even numbers 2, 4, 6, and 8 equal to or smaller than the reference value, and at the time of transmitting ACK, UE 2 maps transmission signals to subcarriers associated with ACK and having even numbers 10 and 12 larger than the reference value.

Here, among the subcarriers in the PRB, the subcarriers associated with ACK and the subcarriers associated with NACK differ from each other with respect to UE 1 and UE 2. Moreover, among the subcarriers in the PRB, the subcarriers associated with UE 1 and the subcarriers associated with UE 2 differ from each other. That is, in the respective subcarriers associated with ACK (in FIGS. 11B and 11D, subcarrier numbers 9 to 12) and the respective subcarriers associated with NACK (in FIGS. 11A and 11C, subcarrier numbers 1 to 8), a different subcarrier is associated with each of user terminals 20.

User terminal 20 gives notification of ACK/NACK of each user terminal 20 according to the subcarrier position, while associating the subcarrier positions (subcarrier numbers), user terminals 20, and ACK/NACK. Through this processing, even in the case where transmission signals of a plurality of user terminals are multiplexed, user terminal 20 can give notification of ACK/NACK by using 1 symbol, as in the case of Embodiment 1.

On the other hand, radio base station 10 measures received power of each subcarrier with respect to the received signal. Then, radio base station 10 identifies user terminal 20 (UE 1 or UE 2) that gives notification of ACK/NACK based on the position (odd number of even number) of the subcarrier in which the signal is observed. Further, radio base station 10 compares the received power of the NACK determination region with the received power of the ACK determination region, and determines that ACK or NACK corresponding to a determination region having larger received power is notified from identified user terminal 20.

<Resource Assignment Method>

Next, a resource assignment method for a plurality of user terminals 20 in which transmission signals for notifying ACK/NACK are multiplexed will be described.

In the present embodiment, a resource may be assigned to user terminal 20 in the same manner as in Embodiment 1, for example. However, information for each user terminal 20 required for UE multiplexing (for example, a subcarrier number (odd number or even number) to be associated with each user terminal 20) may be notified to user terminal 20 as UE individual information by using signaling or physical layer control information of the upper layer. Moreover, as the reference value of the subcarrier numbers is common in user terminals 20, it may be notified to the entire cells covered by radio base station 10 by using cell information and/or the like.

For example, user terminal 20 sets a reference value of subcarrier numbers for mapping transmission signals when notifying the ACK/NACK, based on the cell information.

Further, user terminal 20 identifies subcarriers (even number or odd number) on which transmission signals are mapped in the PRB for ACK/NACK, based on the UE individual information. For example, as information relating to a subcarrier on which a transmission signal is mapped, when '1' is notified, user terminal 20 may use a subcarrier of an odd number, while when '0' is notified, user terminal 20 may use a subcarrier of even number. Note that the relationship between '0' and '1' and ACK and NACK may be opposite.

Then, user terminal 20 transmits a transmission signal in a subcarrier associated with ACK/NACK to be notified, in accordance with the reference value and the subcarrier number set in the own apparatus.

In the case where a plurality of PRBs are assigned, user terminal 20 may assign ACK/NACK in a plurality of bits to the PRBs respectively in a predetermined order. For example, the predetermined order may be an ascending order or a descending order of indexes (for example, PRB numbers) in the frequency direction or the time direction.

<Operation of User Terminal 20 and Radio Base Station 10>

Next, specific examples of transmission operation of user terminal 20 and receiving operation of radio base station 10 in Embodiment 3 will be described.

In the below description, the reference value of subcarrier numbers is 8, NACK is associated with subcarrier numbers 1 to 8, and ACK is associated with subcarrier numbers 9 to 12, as shown in FIGS. 11A to 11D. Further, UE 1 is associated with subcarriers of odd numbers, and UE 2 is associated with subcarriers of even numbers. Further, with respect to UE 1 and UE 2, two PRBs (PRB #1 and #2) are assigned in the frequency direction.

Figure 12B:
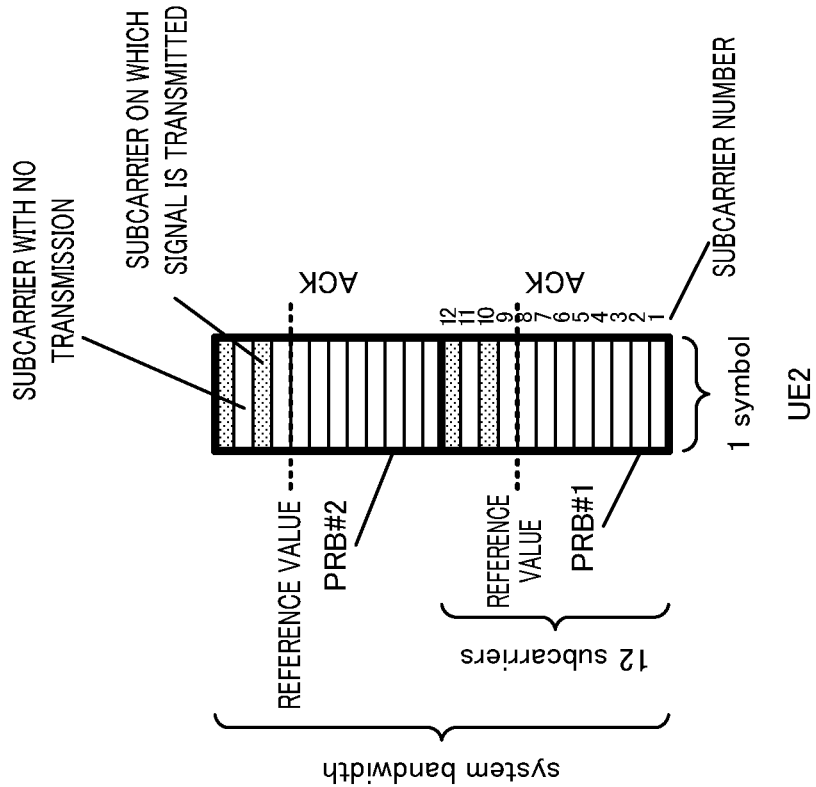
FIG. 12B shows an example of ACK/NACK notification by UE 2 according to Embodiment 3.
Figure 12A:
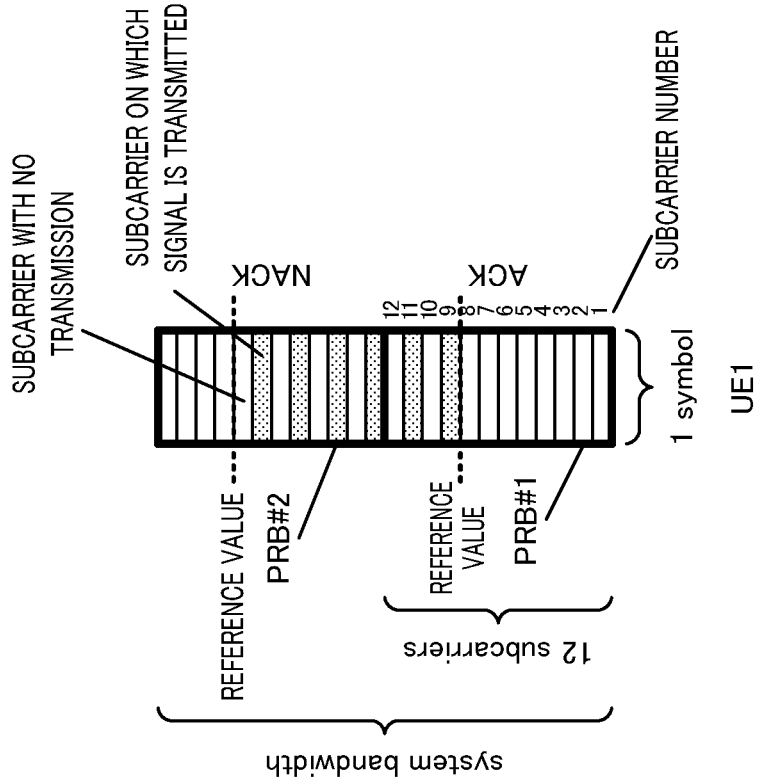
FIG. 12A shows an example of ACK/NACK notification by UE 1 according to Embodiment 3.

FIG. 12A shows an example of mapping transmission signals in UE 1. In FIG. 12A, UE 1 gives notification of 2-bit ACK/NACK of ACK and NACK. Specifically, UE 1 maps transmission signals to subcarriers associated with ACK and having odd numbers 9 and 11 larger than the reference value in PRB #1, and maps transmission signals to subcarriers associated with NACK and having odd numbers 1, 3, 5, and 7 equal to or smaller than the reference value in PRB #2.

FIG. 12B shows an example of mapping transmission signals in UE 2. In FIG. 12B, UE 2 gives notification of 2-bit ACK/NACK of ACK and ACK. Specifically, UE 2 maps transmission signals to subcarriers associated with ACK and having even numbers 10 and 12 larger than the reference value in PRB #1 and PRB #2, respectively.

Figure 13:
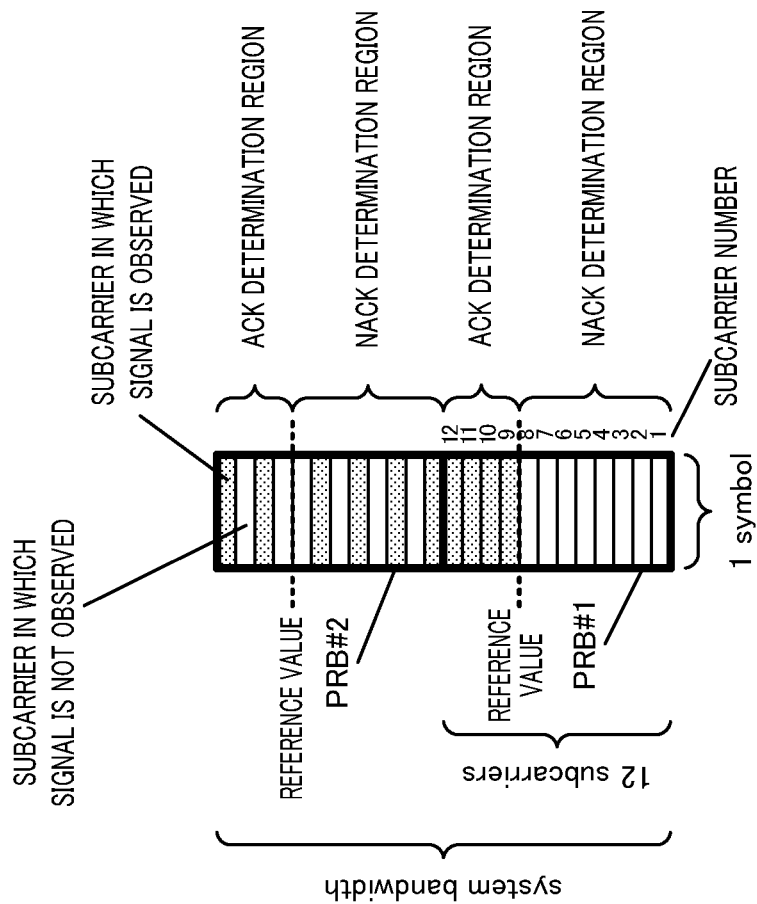
FIG. 13 shows an example of ACK/NACK determination according to Embodiment 3.

On the other hand, radio base station 10 measures received power of a received signal in which the signals shown in FIGS. 12A and 12B are multiplexed, and identifies subcarriers in which the signals are observed as shown in FIG. 13. Specifically, in FIG. 13, radio base station 10 observes signals in the entire subcarriers of subcarrier numbers 9 to 12 in the ACK determination region, in PRB #1. Further, in PRB #2, radio base station 10 also observes signals in subcarriers of odd numbers 1, 3, 5, and 7 in the NACK determination region, and in subcarriers of even numbers 10 and 12 in the ACK determination region.

Thereby, radio base station 10 determines that it is notified of ACK and NACK from UE 1, and determines that it is notified of ACK and ACK from UE 2.

<Reception Operation when Frequency Offset Occurs>

Next, Reception Examples 1 and 2 in radio base station 10 in the case where frequency offset is generated in Embodiment 3 will be described.

Figure 14:
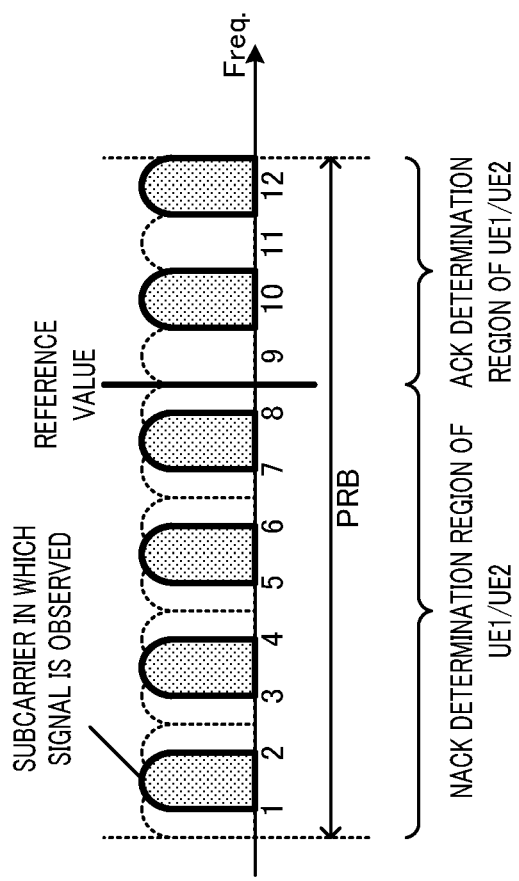
FIG. 14 shows an example of ACK/NACK determination according to Reception Example 1 of Embodiment 3.

Reception Example 1 (FIG. 14)

In Reception Example 1, signals are observed in the subcarriers of even numbers in the ACK determination region, as shown in FIG. 14. In that case, radio base station 10 determines that ACK is notified from UE 2, based on the association between ACK/NACK of user terminals 20 and subcarriers shown in FIGS. 11A to 11D.

On the other hand, as shown in FIG. 14, in the NACK determination region, positions of the subcarriers in which signals are observed (positions indicated by the solid lines) are deviated from the original positions (positions indicated by the dotted lines). In that case, radio base station 10 cannot determine whether the subcarriers are of odd numbers or even numbers. However, as radio base station 10 has been able to determine that ACK is notified from UE 2, it can determine that the other signals observed in the NACK determination region are NACK from UE 1.

In this way, even in the case where ACK/NACK of some user terminals 20 cannot be determined independently due to a frequency offset, radio base station 10 can determine ACK/NACK of one user terminal 20 based on ACK/NACK determination result of the other user terminal 20.

In FIG. 14, radio base station 10 may transmit retransmission data only to UE 1, based on the determination result that UE 1 is NACK and UE 2 is ACK.

Alternatively, on the assumption that accuracy of ACK/NACK determination with respect to both user terminals 20 is poor because ACK/NACK determination of one user terminal 20 (UE 1) cannot be performed independently, that is, on the assumption that ACK determination of UE 2 may also be wrong, radio base station 10 may transmit retransmission data to both UE 1 and UE 2. In other words, radio base station 10 determines that NACK is notified from both UE 1 and UE 2. As described above, in FIG. 14, in the case where radio base station 10 makes determination of NACK with respect to UE 2 depending on the state of the other user terminals 20 although it can make determination of ACK with respect to UE 2 independently, ACK to NACK error rate is increased but NACK to ACK error rate can be reduced. Through this processing, it is possible to prevent occurrence of retransmission in the upper layer, and to avoid transmission latency from being increased.

Figure 15:
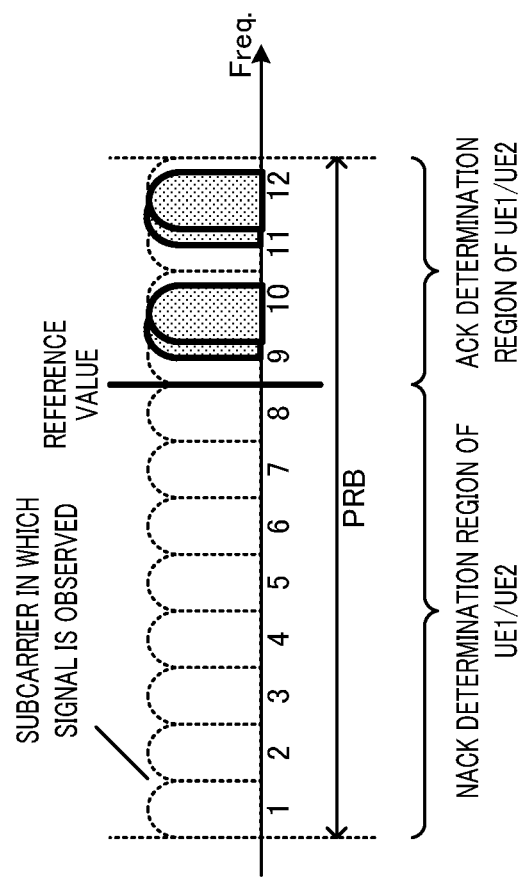
FIG. 15 shows an example of ACK/NACK determination according to Reception Example 2 of Embodiment 3.

Reception Example 2 (FIG. 15)

In Reception Example 2, as shown in FIG. 15, radio base station 10 observes signals of received power for two UEs in the subcarriers in the ACK determination region. However, as shown in FIG. 15, the positions (positions indicated by the solid lines) of the subcarriers in which signals are observed in the ACK determination region are shifted from the original positions (positions indicated by the dotted lines), so that radio base station 10 cannot determine whether the subcarriers are of the even numbers or of the odd numbers. That is, radio base station 10 cannot determine that the signals are transmitted from which of UE 1 or UE 2 individually, based on the positions of the subcarriers in which the signals are observed.

However, as signals corresponding to two UEs are observed in the ACK determination region, radio base station 10 can determine that both UE 1 and UE 2 give notification of ACK.

In this way, even in the case where ACK/NACK of each user terminal 20 cannot be determined independently due to a frequency offset, radio base station 10 can collectively determine ACK/NACK of a plurality of user terminals 20 based on the received power measured in the ACK determination region or NACK determination region.

In general, the probability that ACK is transmitted is higher than the probability that NACK is transmitted, although it depends on the data error rate. Therefore, a situation where ACK is notified simultaneously from a plurality of user terminals 20 occurs at high frequency. In contrast, as shown in FIG. 15, even if a frequency offset occurs, radio base station 10 can determine ACK of a plurality of user terminals 20 accurately, which occurs at high frequency. Accordingly, determination accuracy of ACK/NACK can be improved.

In FIG. 15, determination of ACK is described as an example. However, radio base station 10 can determine NACK in the same manner.

Reception Examples 1 and 2 have been described.

In this way, user terminal 20 associates the positions of the frequency resources (subcarriers) on which transmission signals are transmitted with ACK/NACK, and associates user terminals 20 to which ACK/NACK is notified with the positions of the frequency resources, similar to Embodiments 1 and 2. Through this processing, it is possible to multiplex transmission signals of a plurality of user terminals 20 in a resource of 1 symbol.

In the present embodiment, description has been given on the case where subcarriers in which a reference value is used as the boundary and ACK/NACK are associated with each other, and the numbers (even numbers/odd numbers) of the subcarriers and user terminals 20 are associated with each other, as shown in FIGS. 11A to 11D. However, in the present embodiment, it is also possible that subcarriers in which a reference value is used as the boundary and user terminals 20 are associated with each other, and that the numbers (even number/odd number) of the subcarriers and ACK/NACK are associated with each other.

Embodiment 4

In the present embodiment, description will be given on transmission signals to be transmitted from a plurality of user terminals for ACK/NACK notification.

Regarding a radio base station and a user terminal according to Embodiment 4, the basic configurations thereof are common to those of radio base station 10 and user terminal 20 of Embodiment 1. Accordingly, description will be given with use of FIGS. 1 and 2.

In the existing LTE systems, the sequence length of a transmission signal sequence of ACK/NACK is defined to be an integer multiple of 12. On the other hand, in the present embodiment, the transmission signal sequence length may be less than 12 because a transmission signal is transmitted at the position of a subcarrier associated with ACK/NACK in the PRB, as described in Embodiments 1 to 3.

In the below description, as an example, it is assumed that a transmission signal sequence having a sequence length of 1, 2, 3, ..., (the number of subcarriers in PRB (for example, 12)) or a generation method of such a transmission signal sequences is previously defined by the specification.

It is preferable that a transmission signal sequence has a small cross-correlation between sequences and is a sequence approximated to a CASAC sequence. For example, user terminal 20 (transmission signal generator 206) may generate a transmission signal sequence of a desired sequence length by cyclically extending a Zadoff-Chu (ZC) sequence of a prime number length, or may generate a transmission signal sequence of a desired sequence length by excluding a part of a ZC sequence of a prime number length.

User terminal 20 may also generate Computer Generated Sequences (CGS) approximated to a CASAC sequence as transmission signal sequences.

When the sequence length is a prime number, user terminal 20 may generate a ZC sequence, while when the sequence length is other than a prime number, user terminal 20 may generate CGS. When the sequence length is 12, user terminal 20 may generate a sequence similar to that of the existing LTE system.

When generating a transmission signal sequence, user terminal 20 may be notified of information described below, from a network (for example, radio base station 10).
(i) Sequence length
(ii) Phase rotation amount of sequence (cyclic shift amount)
(iii) Assignment of Orthogonal Cover Code (OCC)

However, the sequence length may not be notified. User terminal 20 may identify the number of subcarriers on which transmission signal sequence is mapped, and use the sequence length of the same number as the number of the identified subcarriers, based on the method described in Embodiments 1 to 3.

For example, in FIG. 12A described in Embodiment 3, UE 1 maps the transmission signal sequences to two subcarriers in PRB #1, and maps the transmission signal sequences to four subcarriers in PRB #2. Accordingly, UE 1 may generate transmission signal sequences having a sequence length 2 and a sequence length 4. Alternatively, UE 1 may generate one transmission signal sequence having a sequence length 6 (=2+4). Similarly, in FIG. 12B described in Embodiment 3, UE 2 maps transmission signal sequences to two subcarriers in both PRBs #1 and #2. Therefore, UE 2 may generate two transmission signal sequences each having a sequence length 2. Alternatively, UE 2 may generate one transmission signal sequence having a sequence length 4 (=2+2).

User terminal 20 applies phase rotation (cyclical shift) to the generated transmission signal sequence and applies orthogonal cover code to thereby generate a transmission signal. Then, based on the mapping method described in any of Embodiments 1 to 3, user terminal 20 maps and transmits the transmission signal to a subcarrier corresponding to ACK/NACK to be notified.

By transmitting a transmission signal sequence generated in this manner by user terminal 20, it is possible to prevent interference between transmission signal sequences transmitted from a plurality of user terminals 20 for ACK/NACK notification.

Modification of Embodiment 4

In the above embodiment, description has been given on the case where a CAZAC sequence is mapped to a subcarrier as a transmission signal sequence. However, a transmission signal sequence to be mapped to a subcarrier when notifying ACK/NACK is not limited to a CAZAC sequence. For example, user terminal 20 may generate a transmission signal sequence by encoding or modulating other information such as a UL data signal or a control signal, and map it to a subcarrier.

Figure 16A:
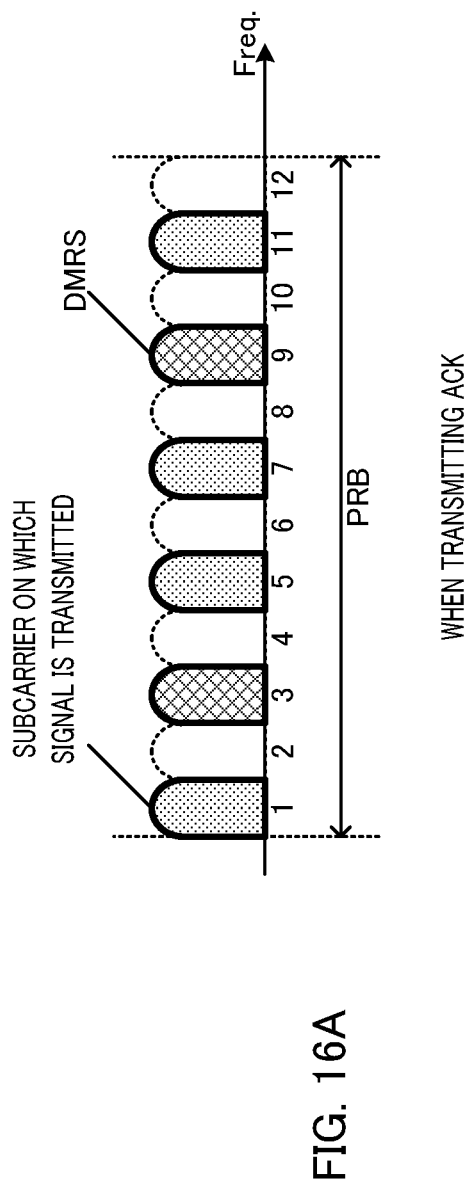
FIG. 16A shows an example of mapping at the time of transmitting ACK according to a modification of Embodiment 4.
Figure 16B:
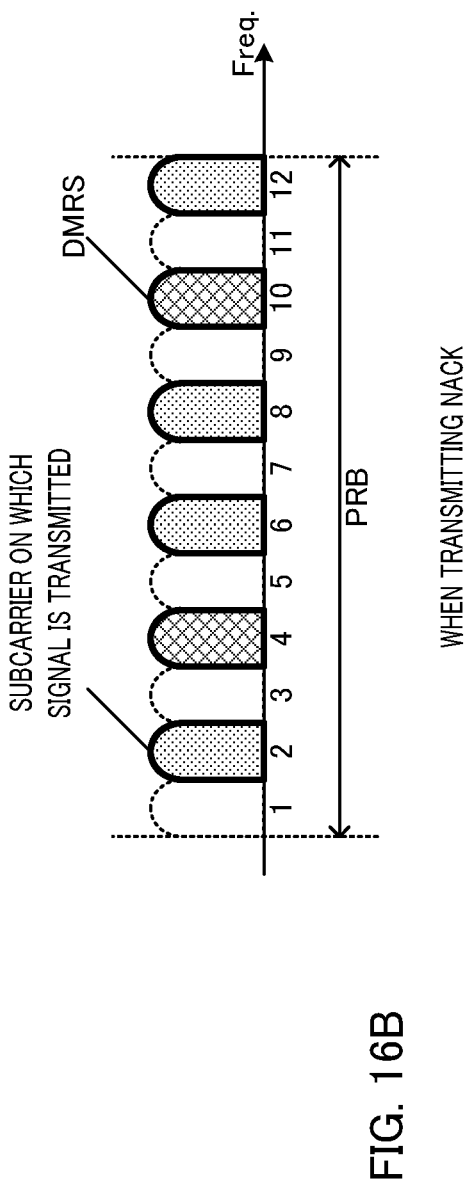
FIG. 16B shows an example of mapping at the time of transmitting NACK according to a modification of Embodiment 4.

FIGS. 16A and 16B show examples of mapping when a UL data signal or a control signal is mapped to a subcarrier when notifying ACK/NACK. FIG. 16A shows mapping of signals at the time of transmitting ACK, and FIG. 16B shows mapping of signals at the time of transmitting NACK.

As shown in FIGS. 16A and 16B, when mapping UL data signals or control signals to subcarriers, user terminal 20 may map DMRS to a part of the subcarriers on which a transmission signal sequence is mapped. In that case, radio base station 10 performs channel estimation using the DMRS mapped to a part of the subcarriers, and based on the channel estimation result, demodulates and decodes the UL data signal or the control signal mapped to the other subcarriers (not shown). When DMRS is transmitted, user terminal 20 is able to map and transmit a UL data signal or a control signal to a subcarrier, and, since ACK/NACK can be notified by using the position of the subcarrier, it is possible to increase the number of bits in total that can be notified to the frequency resource (subcarrier) to be used.

Further, user terminal 20 may map, to a subcarrier, a signal and DMRS in which ACK/NACK is encoded and modulated, and notify ACK/NACK by using the position of the subcarrier. Through this processing, as information of ACK/NACK is made redundant and transmitted, it is possible to improve the bit error rate of ACK/NACK.

Note that the sequence of DMRS may be a CAZAC sequence (ZC sequence, CGS, and/or the like) described above.

Further, the content to be transmitted by the control signal used as a transmission signal sequence may be previously defined in the specification, or identified according to a notification from the network among a plurality of candidates defined previously. Furthermore, as the number of bits of the control signal used as a transmission signal sequence, the number of bits corresponding to the content to be transmitted by the control signal may be defined in advance or may be notified from the network.

As described above, user terminal 20 is able to implicitly notify radio base station 10 of ACK/NACK, while transmitting a UL data signal or a control signal to radio base station 10. In other words, by mapping a data signal or a control signal to a subcarrier for notifying ACK/NACK, it is possible to improve the resource use efficiency.

The respective embodiments of the present invention have been described.

OTHER EMBODIMENTS (1) The aforementioned embodiments are not limited to the case where the sTTI length is 1 symbol, and may be applicable to the case where user terminal 20 notifies the ACK/NACK by using 1 symbol.

Application Example 1

For example, the aforementioned embodiments may be applicable when sTTI is configured of a plurality of symbols. For example, in the conventional method, when the sTTI length has 3 symbols, although PUCCH can be transmitted by using 2 symbols, PUCCH cannot be assigned to the remaining 1 symbol which is wasted.

In contrast, in the aforementioned embodiments, even in the case where the sTTI length has 3 symbols, PUCCH (ACK/NACK) can be assigned to all of the symbols in the sTTI, respectively. That is, in the aforementioned embodiments, as user terminal 20 can notify ACK/NACK in a symbol unit, it is possible to assign PUCCH flexibly to user terminal 20.

Application Example 2

Figure 17A:
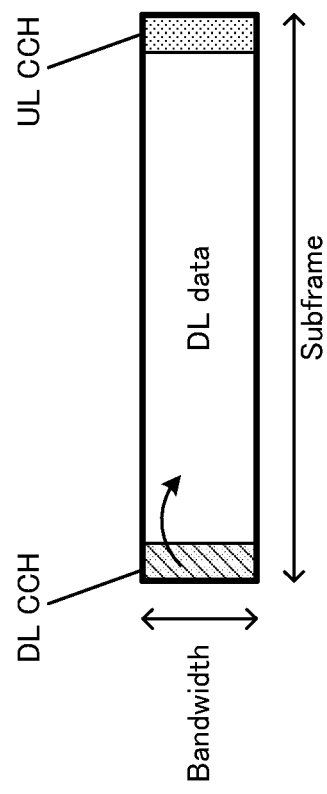
FIG. 17A shows an exemplary configuration in which a DL CCH, a DL data signal, and a UL CCH are transmitted in one subframe.
Figure 17B:
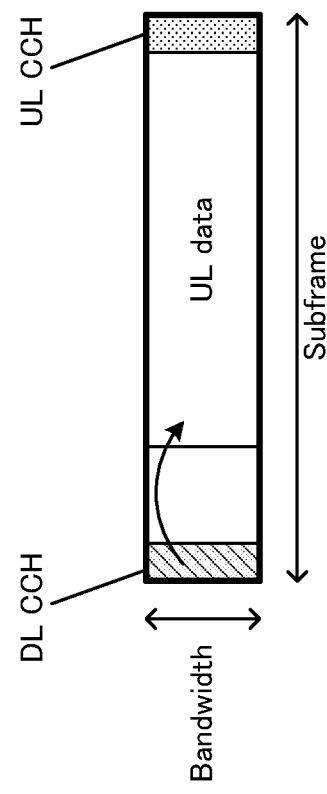
FIG. 17B shows an exemplary configuration in which a DL CCH, a UL data signal, and a UL CCH are transmitted in one subframe.

In the case of 5G, for example, it is considered to have a configuration of transmitting a DL control channel (DL CCH) and a UL control channel (UL CCH) in a particular symbol in one subframe configured of a plurality of symbols. For example, FIG. 17A shows a configuration in which, in one subframe, DL CCH including assignment of a DL data signal is transmitted in a first symbol, and a UL CCH including ACK/NACK with respect to DL data assigned by the DL CCH is transmitted in the last symbol (that is, 1 symbol). Further, FIG. 17B shows a configuration in which, in one subframe, DL CCH including assignment of a UL data signal is transmitted in a first symbol, and UL CCH is transmitted in the last symbol. In 5G, by using such a configuration, it is possible to prevent interference between a control channel and a data channel, while realizing dynamic time division duplex (TDD) in which DL (FIG. 17A) and UL (FIG. 17B) of the data channel are switched by each subframe.

Figure 18A:
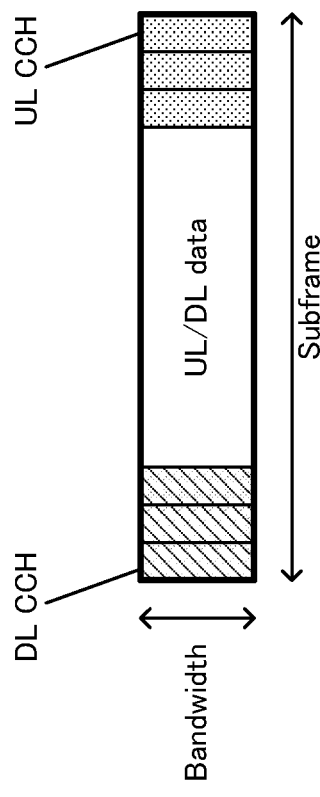
FIG. 18A shows an exemplary configuration in which a DL CCH, a UL/DL data signal, and a UL CCH are transmitted in one subframe.
Figure 18B:
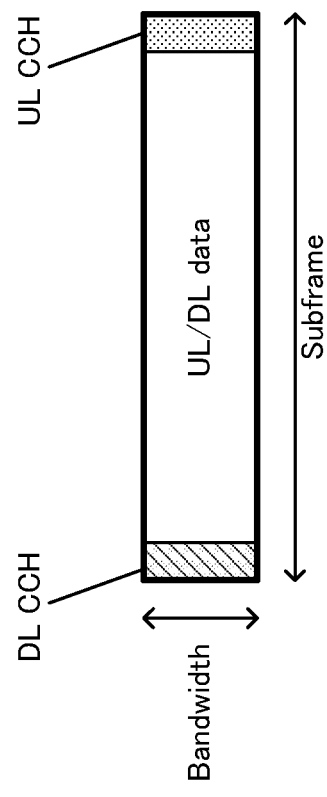
FIG. 18B shows an exemplary configuration in which a DL CCH, a UL/DL data signal, and a UL CCH are transmitted in one subframe.

Further, as shown in FIG. 18A, when the number of symbols to which DL/UL control channel is arranged is larger (in FIG. 18A, 3 symbols for each DL/UL CCH), the overhead increases. Therefore, as shown in FIG. 18B, the number of symbols to which DL/UL control channel is arranged is likely to be set to a small value such as 1 symbol.

Accordingly, in the subframe configuration as shown in FIGS. 17A and 17B or FIGS. 18A and 18B, ACK/NACK is transmitted in UL CCH having 1 symbol or a few symbols. In contrast, according to the present embodiment, even in the subframe configuration as shown in FIGS. 17A and 17B or FIGS. 18A and 18B, user terminal 20 may notify ACK/NACK in UL CCH of 1 symbol.

Figure 19A:
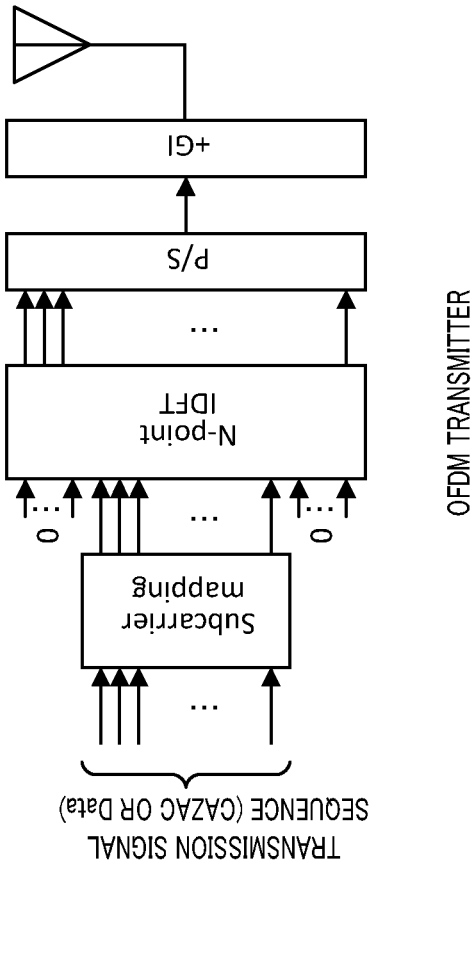
FIG. 19A shows an exemplary configuration of an OFDM transmitter provided to a user terminal according to the present invention.
Figure 19B:
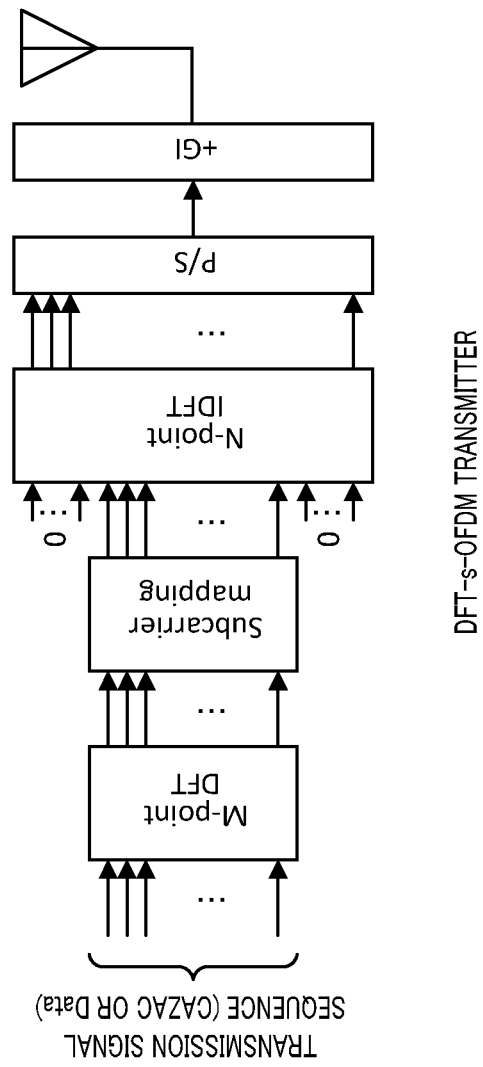
FIG. 19B shows an exemplary configuration of a DFT-s-OFDM transmitter provided to a user terminal according to the present invention.

(2) The signal waveform in the radio communication system according to the aforementioned embodiments may also be Orthogonal Frequency Division Multiplexing (OFDM) or Discrete Fourier Transform spread OFDM (DFT-s-OFDM). For example, when using OFDM, user terminal 20 (FIG. 2) has a configuration of an OFDM transmitter shown in FIG. 19A, while when using DFT-s-OFDM, user terminal 20 (FIG. 2) has a configuration of a DFT-s-OFDM transmitter shown in FIG. 19B. Note that a block represented by "Subcarrier mapping" shown in FIGS. 19A and 19B corresponds to the mapper 207 of user terminal 20. Further, in FIGS. 19A and 19B, a transmission signal sequence to be mapped to a subcarrier may be a CAZAC sequence or a UL data signal (or control signal), as described in Embodiment 4.

(3) In the aforementioned embodiments, description has been given on transmission of information (PUCCH) in the uplink. However, the present invention may be applied to transmission of information in the downlink. In that case, a user terminal herein may be replaced with a radio base station, and a radio base station may be replaced with a user terminal. It is also possible to have a configuration that radio base station 10 has the function of user terminal 20 described above.

Further, the present invention is not limited to the communication between a radio base station and a user terminal. The present invention may be applicable to communication between a plurality of user terminals (Device-to-Device: D2D), for example. In that case, it is also possible to have a configuration in which user terminal 20 has the function of radio base station 10 described above. In addition, wording such as "up" or "down" may be read as a "side". For example, an uplink channel may be read as a side channel.

(4) In the embodiments described above, description has been given on the case of notifying ACK/NACK using 1 symbol, according to the position of a frequency resource (subcarrier). However, information to be notified by using 1 symbol according to the position of the frequency resource is not limited to ACK/NACK. Examples of information to be notified by using 1 symbol according to the position of the frequency resource include a Scheduling Request (SR) and/or the like, for example.

(5) In the embodiments described above, description has been given on the case of using a subcarrier as a unit of a frequency resource with which ACK/NACK is associated. However, the unit of a frequency resource with which ACK/NACK is associated is not limited to a subcarrier. The unit may be a resource unit configured of a plurality of subcarriers such as PRB or a Resource Element Group (REG) configured of a plurality of Resource Elements (RE).

(6) In the combination of ACK/NACK and a subcarrier position (number) shown in FIGS. 4A, 4B, 6A, 6B, 8A, 8B, 11A to 11D, 16A, and 16B, ACK and NACK may be opposite.

(Hardware Configuration)

Note that the block diagrams used to describe embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, by means of wired and/or wireless) connected, and the plurality of apparatuses may realize the functional blocks.

Figure 20:
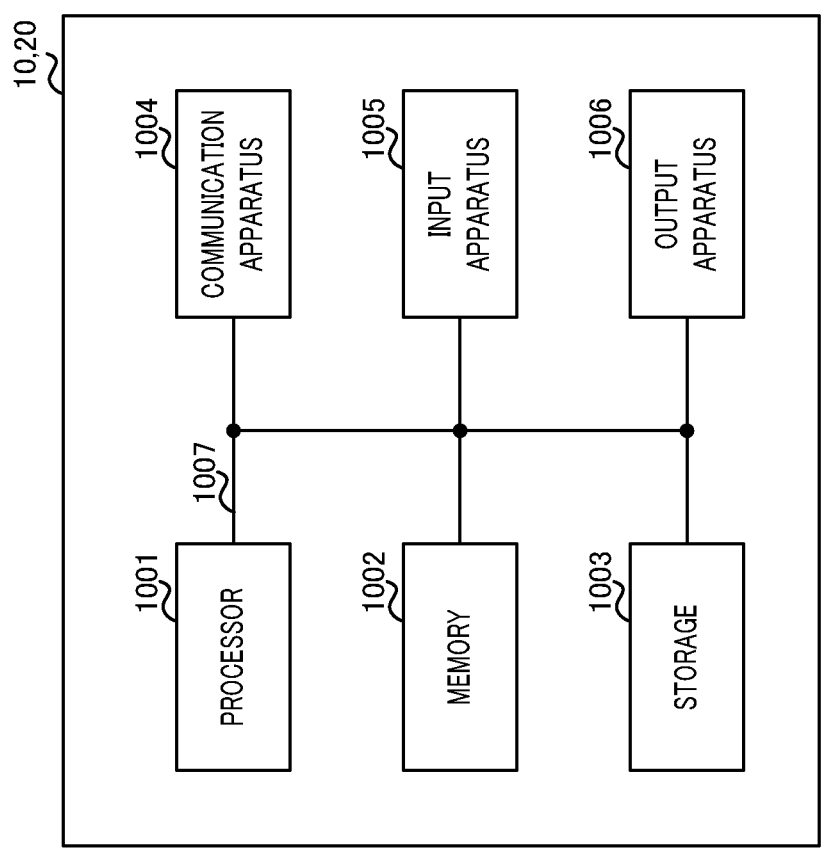
FIG. 20 shows an example of a hardware configuration of a radio base station and a user terminal according to the present invention.

For example, radio base station 10, user terminal 20, and/or the like according to one embodiment of the present invention may function as a computer that executes processing of a communication method of the present invention. FIG. 20 illustrates an example of a hardware configuration of radio base station 10 and user terminal 20 according to one embodiment of the present invention. Radio base station 10 and user terminal 20 may be physically formed as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

The functions of radio base station 10 and user terminal 20 are realized by loading predetermined software (program) on the hardware of processor 1001, memory 1002, and/or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be formed by a central processing unit (CPU) including an interface for peripheral apparatus, a control apparatus, an operation apparatus, a register, and/or the like. For example, encoder 101, modulator 102, retransmission controller 103, received power measurer 107, ACK/NACK determiner 108, demodulator 203, decoder 204, error detector 205, transmission signal generator 206, mapper 207, and/or the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in embodiments. For example, at least part of the functional blocks forming radio base station 10 or user terminal 20 may be realized by a control program stored in memory 1002 and operated by processor 1001. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be formed by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to one embodiment of the present invention.

Storage 1003 is a computer-readable recording medium and may be formed by, for example, at least one of an optical disk such as a CD-ROM (Compact Disc ROM), a hard disk drive, a flexible disk, a magneto-optical disk (for example, a compact disc, a digital versatile disk, or a Blue-ray (registered trademark) disk), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, antennas 105 and 201, transmitters 104 and 208, receivers 106 and 202, and/or the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by other methods. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, 5G+(5G plus), FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and/or the Like)

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station in the specification may be performed by an upper node depending on the situation. Various operations performed for communication with a terminal in a network formed by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and/or the like can be output from a higher layer (or a lower layer) to a lower layer (or a higher layer). The information, the signals, and/or the like may be input and output through a plurality of network nodes.

(Handling of Input and Output Information and/or the Like)

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

(Judgement Method)

The judgement may be made based on a value expressed by 1 bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or other remote sources by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

(System and Network)

The terms "system" and "network" used in the present specification can be interchangeably used.

(Names of Parameters and Channels)

The information, the parameters, and/or the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

(Terminal)

The terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompasses a wide variety of actions. For example, "determining" may be regarded as judging, calculating, computing, processing, deriving, investigating, looking up (for example, looking up in a table, a database or another data structure), ascertaining and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard.

The description "based on" used in the present specification does not mean "only based on," unless otherwise specifically stated. In other words, the description "based on" means both of "only based on" and "at least based on."

As used herein, reference to any elements using designations such as "first" and "second" does not generally limit the quantity or order of those elements. These designations may be used herein as a convenient method of distinguishing two or more elements from each other. Therefore, reference to first and second elements does not mean only two elements can be employed there or the first element must precede the second element in some form or other.

The "section" in the configuration of each apparatus may be replaced with "means," "circuit," "device," and/or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be formed by one or a plurality of frames in the time domain. One or each of a plurality of frames may be called a subframe in the time domain. The subframe may be further formed by one or a plurality of slots in the time domain. The slot may be further formed by one or a plurality of symbols (OFDM symbols, SC-FDMA symbols, and/or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning a radio resource to each mobile station (such as frequency bandwidth that can be used by each mobile station or transmission power). The minimum time unit of scheduling may be called a TTI (Transmission Time Interval). For example, one subframe may be called a TTI. A plurality of contiguous subframes may be called a TTI. One slot may be called a TTI.

The resource block (RB) is a resource assignment unit of the time domain and the frequency domain, and the resource unit may include one or a plurality of contiguous subcarriers in the frequency domain. One or a plurality of symbols may be included in the time domain of the resource block, and the length may be one slot, one subframe, or one TTI. One TTI and one subframe may be formed by one or a plurality of resource blocks.

The structure of the radio frame is exemplary only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and/or the Like of Aspects)

The aspects and embodiments described in the present specification may be independently used, may be combined and used, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to the embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2016-201883 filed on Oct. 13, 2016, and the entire content of Japanese Patent Application No. 2016-201883 is hereby incorporated by reference.

INDUSTRIAL APPLICABILITY

An aspect of the present invention is useful for a mobile communication system.

REFERENCE SIGNS LIST

10 Radio base station
20 User terminal
101 Encoder
102 Modulator
103 Retransmission controller
104, 208 Transmitter
105, 201 Antenna
106, 202 Receiver
107 Received power measurer
108 ACK/NACK determiner
203 Demodulator
204 Decoder
205 Error detector
206 Transmission signal generator
207 Mapper

The invention claimed is:

1. A user terminal, comprising:
a receiver that detects presence or absence of an error with respect to a downlink data signal;
a transmitter that generates an ACK or NACK which is an error detection result; and
a processor, coupled to the transmitter and the receiver, that maps, when the error detection result is ACK, a transmission signal to a first frequency resource in one symbol associated with the ACK, and that maps, when the error detection result is NACK, the transmission signal to a second frequency resource which is different from the first frequency resource in a same symbol and which is associated with the NACK,
wherein:
in a resource block defined by a plurality of subcarriers and one symbol,
the first frequency resource is, among the plurality of the subcarriers, a subcarrier of a high frequency side or a low frequency side including a subcarrier serving as a reference,
the second frequency resource is, among the plurality of the subcarriers, a subcarrier other than the subcarrier included in the first frequency resource, and
a number of the subcarriers included in the first frequency resource is less than a number of the subcarriers included in the second frequency resource.

2. The user terminal according to claim 1, wherein
in the resource block defined by the plurality of the subcarriers and the one symbol,
the first frequency resource is one of an odd-numbered subcarrier or an even-numbered subcarrier among the plurality of the subcarriers, and
the second frequency resource is another one of the odd-numbered subcarrier or the even-numbered subcarrier among the plurality of the subcarriers.

3. The user terminal according to claim 1, wherein
in each of the first frequency resource and the second frequency resource, different frequency resources are associated with a plurality of the user terminals.

4. A radio communication method, comprising:
detecting presence or absence of an error with respect to a downlink data signal, and generating ACK or NACK as an error detection result; and
mapping, when the error detection result is ACK, a transmission signal to a first frequency resource in one symbol associated with the ACK, and mapping, when the error detection result is NACK, the transmission signal to a second frequency resource which is different from the first frequency resource in a same symbol and which is associated with the NACK,
wherein:
in a resource block defined by a plurality of subcarriers and one symbol,
the first frequency resource is, among the plurality of the subcarriers, a subcarrier of a high frequency side or a low frequency side including a subcarrier serving as a reference, and
the second frequency resource is, among the plurality of the subcarriers, a subcarrier other than the subcarrier included in the first frequency resource, and a number of the subcarriers included in the first frequency resource is less than a number of the subcarriers included in the second frequency resource.

* * * * *